US012118925B2

(12) United States Patent
Chang et al.

(10) Patent No.: US 12,118,925 B2
(45) Date of Patent: *Oct. 15, 2024

(54) DRIVING SIGNALS AND DRIVING CIRCUITS IN DISPLAY DEVICE AND DRIVING METHOD THEREOF

(71) Applicant: AU Optronics Corporation, Hsin-Chu (TW)

(72) Inventors: Che-Chia Chang, Hsin-Chu (TW); Shang-Jie Wu, Hsin-Chu (TW); Yu-Chieh Kuo, Hsin-Chu (TW); Hsien-Chun Wang, Hsin-Chu (TW); Sin-An Lin, Hsin-Chu (TW); Mei-Yi Li, Hsin-Chu (TW); Yu-Hsun Chiu, Hsin-Chu (TW); Ming-Hung Chuang, Hsin-Chu (TW); Yi-Jung Chen, Hsin-Chu (TW)

(73) Assignee: AU OPTRONICS CORPORATION, Hsin-Chu (TW)

( * ) Notice: Subject to any disclaimer, the term of this patent is extended or adjusted under 35 U.S.C. 154(b) by 0 days.

This patent is subject to a terminal disclaimer.

(21) Appl. No.: 18/243,406

(22) Filed: Sep. 7, 2023

(65) Prior Publication Data

US 2023/0419883 A1 Dec. 28, 2023

Related U.S. Application Data

(63) Continuation of application No. 17/469,115, filed on Sep. 8, 2021, now Pat. No. 11,790,832.

(Continued)

(30) Foreign Application Priority Data

Jan. 11, 2021 (TW) ................................ 110101013

(51) Int. Cl.

*G09G 3/32* (2016.01)
*G09G 3/20* (2006.01)

(52) U.S. Cl.

CPC ............. *G09G 3/32* (2013.01); *G09G 3/2007* (2013.01); *G09G 2300/0809* (2013.01);

(Continued)

(58) Field of Classification Search

CPC ................... G09G 3/32; G09G 3/2007; G09G 2300/0809; G09G 2310/061; G09G 2310/067; G09G 2320/0233

See application file for complete search history.

(56) References Cited

U.S. PATENT DOCUMENTS 8,629,889 B2 1/2014 Eom
9,449,543 B2 9/2016 Shishido (Continued)

FOREIGN PATENT DOCUMENTS

CN 109147673 A 1/2019
CN 109166527 B 7/2020

(Continued)

*Primary Examiner* — Michael Pervan

(74) *Attorney, Agent, or Firm* — WPAT, P.C

(57) ABSTRACT

A display device includes a multiple of light-emitting elements and a multiple of driving circuits. Each of the multiple of driving circuits is configured to generate a driving current flowing through one of the multiple of light-emitting elements. Each of the multiple of driving circuits includes a first transistor, a second transistor, a reset circuit, a first control circuit and a second control circuit. The driving current flows from a first system high voltage terminal through the first transistor, the second transistor and one of the multiple of light-emitting elements to a system low voltage terminal. The first control circuit is configured to control the first transistor to modulate pulse amplitude of the driving current. The second control circuit is configured to (Continued)

control the second transistor to modulate pulse width of the driving current.

10 Claims, 13 Drawing Sheets

Related U.S. Application Data

(60) Provisional application No. 63/090,333, filed on Oct. 12, 2020.

(52) U.S. Cl.
CPC . *G09G 2310/061* (2013.01); *G09G 2310/067* (2013.01); *G09G 2320/0233* (2013.01)

(56) References Cited

U.S. PATENT DOCUMENTS

| | | | |
|---|---|---|---|
| 10,714,024 | B2 | 7/2020 | Yoshida |
| 2009/0009497 | A1 | 1/2009 | Lee |
| 2019/0371231 | A1 | 12/2019 | Kim et al. |
| 2020/0111403 | A1 | 4/2020 | Kim et al. |
| 2020/0111404 | A1 | 4/2020 | Kim et al. |
| 2020/0265777 | A1 | 8/2020 | Shigeta et al. |
| 2021/0201804 | A1 | 7/2021 | Feng |
| 2021/0201810 | A1 | 7/2021 | Feng et al. |
| 2021/0210002 | A1 | 7/2021 | Kim |

FOREIGN PATENT DOCUMENTS

| | | | |
|---|---|---|---|
| JP | 2009015291 | A | 1/2009 |
| WO | WO 2020173262 | A1 | 9/2020 |

DRIVING SIGNALS AND DRIVING CIRCUITS IN DISPLAY DEVICE AND DRIVING METHOD THEREOF

CROSS-REFERENCE TO RELATED APPLICATION

This application is a continuation of U.S. application Ser. No. 17/469,115, filed Sep. 8, 2021, which claims priority to U.S. Provisional Application Ser. No. 63/090,333 filed Oct. 12, 2020, and Taiwan Application Serial Number 110101013, filed Jan. 11, 2021 all of which are herein incorporated by reference in their entireties.

BACKGROUND

Field of Invention

The present invention relates to a display device. More particularly, the present invention relates to a display device with driving circuits and light emitting elements.

Description of Related Art

Generally, pulse amplitude of a driving current flowing through a light emitting element in a display device is adjusted to control a gray level of a sub-pixel to be displayed. However, since the amplitude of the driving current does not linear with the brightness of the light emitting element, the light emitting element cannot display at the accurate gray level by only controlling the pulse amplitude of a driving current.

SUMMARY

One embodiment of the present disclosure is to provide a display device. The display device includes a plurality of light emitting elements and a plurality of driving circuits. Each of the driving circuits is configured to generate a driving current to drive one of the light emitting elements to emit light. Each of the driving circuits includes a first transistor, a second transistor, a reset circuit, a first control circuit and a second control circuit. The driving current flows from a first system high voltage terminal through the first transistor, the second transistor and the one of the light emitting elements to a system low voltage terminal. The reset circuit is configured to reset a voltage level of a gate terminal of the second transistor. The first control circuit is configured to control the first transistor to adjust pulse amplitude of the driving current. The second control circuit is configured to control the second transistor to adjust a pulse width of the driving current, and configured to control the second transistor, according to a corresponding one of a plurality of sweep signals, to adjust a phase of the driving current. Each of the driving circuits provides the driving current at different time points according to the sweep signals.

Another embodiment of the present disclosure is to provide a display device. The display device includes a plurality of light emitting element and a plurality of driving circuit. Each of the driving circuits is configured to generate a driving current to drive one of the light emitting elements to emit light. Each of the driving circuits includes a first transistor, a second transistor, a reset circuit, a first control circuit and a second control circuit. The first transistor and the second transistor are electrically in series between a first system high voltage terminal and a system low voltage terminal. The reset circuit is electrically coupled to a gate terminal of the second transistor. The first control circuit is electrically coupled to a gate terminal of the first transistor, and is configured to control the first transistor to adjust pulse amplitude of the driving current. The second control circuit is electrically coupled to the gate terminal of the second transistor, and is configured to control the second transistor to adjust a pulse width of the driving current, and is configured to control the second transistor, according to a corresponding one of a plurality of sweep signals, to adjust a phase of the driving current. Each of the driving circuits provides the driving current at different time points according to the sweep signals.

The other embodiment of the present disclosure is to provide a driving method for driving a display device with a plurality of driving circuits and a plurality of light emitting elements. Each of the driving circuits is configured to generate a driving current to drive the one of light emitting elements to emit light. The driving method includes the following steps. During a global scanning period, simultaneously providing a plurality of first data signals to the driving circuits according to color of each of the light emitting elements to be display. During a progressive scanning period, sequentially providing a plurality of second data signals to the driving circuits according to gray level of each of the light emitting elements to be display, and sequentially providing a plurality of sweep signals to the driving circuits, wherein each of the driving circuits generates the driving current, according to the one of the first data signals, to drive the one of the light emitting elements to emit light, and each of the driving circuits starts or suspends the driving current according to one of the second data signals.

These and other features, aspects, and advantages of the present invention will become better understood with reference to the following description and appended claims.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
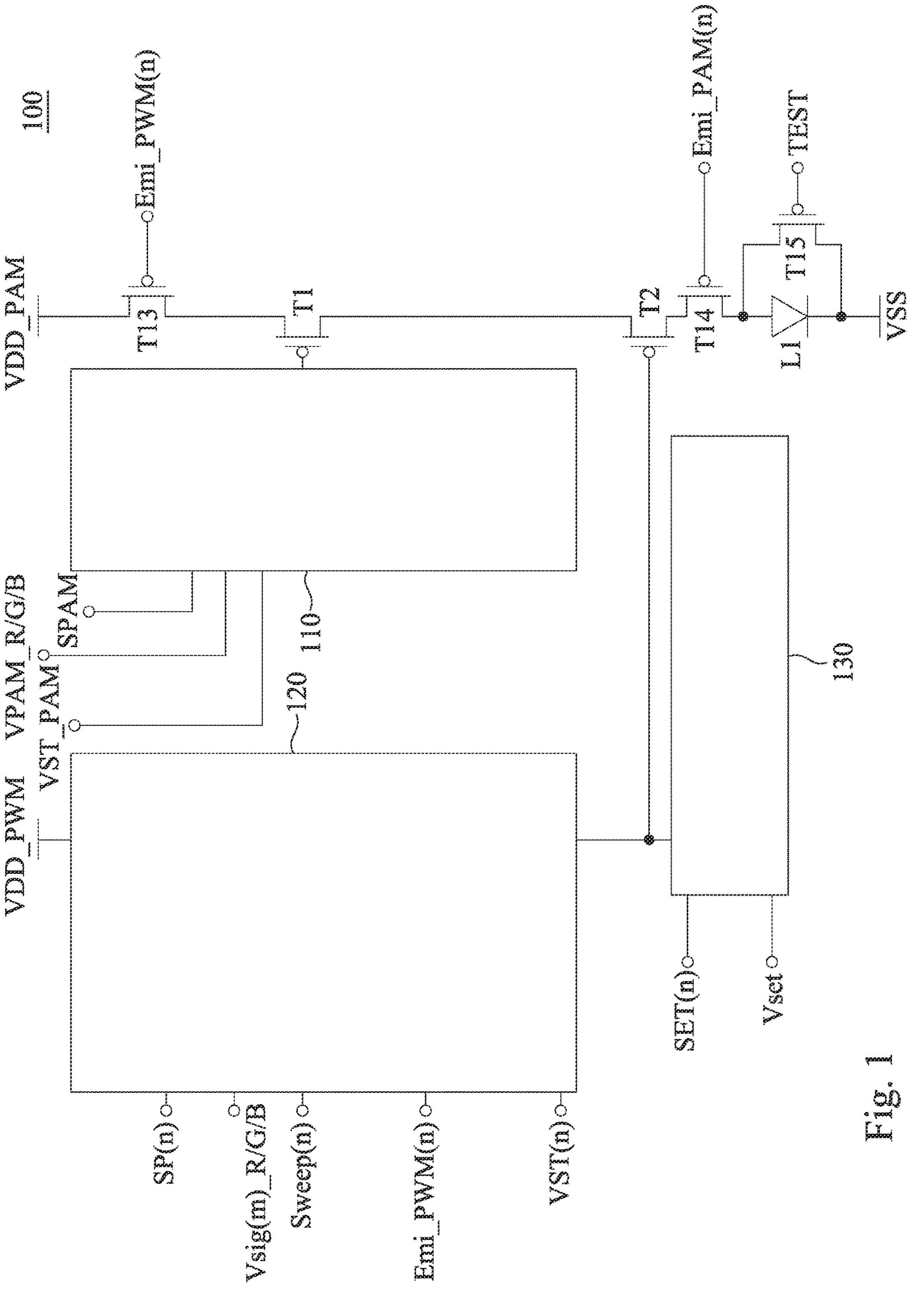
FIG. 1 is a functional block diagram of one of driving circuits and one of light emitting elements in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Reference is made to FIG. 1. FIG. 1 is a functional block diagram of one of driving circuits 100 and one of light emitting elements L1 in accordance with some embodiments of the disclosure. The light emitting elements L1 can be implemented by micro light emitting diode. In the present disclosure, since the one of the driving circuits 100 and the one of the light emitting elements L1 can be formed as a sub-pixel, and a display device is constitute with multiple of sub-pixels, the display device may include multiple of driving circuits 100 and multiple of light emitting elements L1. For simplicity and clarity, FIG. 1 illustrates only one driving circuit 100 and one light emitting element L1. To decrease the non-uniform image displayed by the display device, each of the driving circuits 100 of the present disclosure is to provide a more accurate driving current to the corresponding one of light emitting elements L1.

As shown in FIG. 1, each of the driving circuits 100 includes a first transistor T1, a second transistor T2, a first control circuit 110, a second control circuit 120 and a reset circuit 130. And, each of the driving circuit 100 includes a thirteenth transistor T13, a fourteenth transistor T14 and a fifteenth transistor T15. Each of the driving circuit 100 is configured to generate a driving current to drive the light emitting element L1. The driving current flows from a first system high voltage terminal VDD_PAM through the thirteenth transistor T13, the first transistor T1, the second transistor T2, the fourteenth transistor T14 and the light emitting element L1 to a system low voltage terminal VSS.

The first control circuit 110 of the driving circuit 100 can be considered as a pulse amplitude modulation circuit, and the first control circuit 110 is configured to control a voltage level at the gate terminal of the first transistor T1, in order to control the pulse amplitude of the driving current. The second control circuit 120 of the driving circuit 100 can be considered as a pulse width modulation circuit, and the second control circuit 120 is configured to control timing for turning off the second transistor T2, in order to control the pulse width of the driving current.

The first control circuit 110 is electrically coupled to a gate terminal of the first transistor T1. The first control circuit 110 is configured to receive a corresponding one of multiple of first data signals VPAM_R/G/B, and the first control circuit 110 is configured to control the first transistor T1, according to the corresponding one of the first data signals VPAM_R/G/B, to adjust pulse amplitude of the driving current during following emission periods.

The second control circuit 120 is electrically coupled to the gate terminal of the second transistor T2. The second control circuit 120 is configured to receive a corresponding one of multiple of the second data signals Vsig(m)_R/G/B according to the fourth control signal SP(n), and the second control circuit 120 is configured to receive the sweep signal Sweep(n), to adjust pulse width of the driving current during the following emission periods.

As shown in FIG. 1, since the one of driving circuits 100 and the one of light emitting elements L1 can be formed as the sub-pixel, the light emitting elements L1 can have multiple of types according the color of sub-pixels. For example, the sub-pixel is red sub-pixel, blue sub-pixel or green sub-pixel, the one of light emitting elements L1 is to display red, blue or green light. In addition, the corresponding one of the first data signals VPAM_R/G/B received by the one of the driving circuits 100 can be decided by the color (e.g. red, blue or green) to be displayed by the corresponding one of light emitting elements L1. For example, the first data signals VPAM_R/G/B include red data signal, blue data signal and green data signal, are respectively provided to the driving circuits 100 of the red sub-pixels, the driving circuits 100 of the blue sub-pixels and the driving circuits 100 of the green sub-pixels. Specifically, if the one of the driving circuits 100 is disposed in a red sub-pixel, the first control circuit 110 of the one of the driving circuits 100 can receive the red data signal according to the second control signal SPAM.

The corresponding one of the second data signals Vsig (m)_R/G/B is decided by a gray level to be displayed by each of the light emitting elements L1. If the gray level to be displayed is relatively large, an absolute value of voltage of the corresponding one of the second data signals Vsig (m)_R/G/B can be relatively small. On the other hand, if the gray level to be displayed is relatively small, an absolute value of voltage of the corresponding one of the second data signals Vsig(m)_R/G/B can be relatively large. In other words, the corresponding one of the second data signals Vsig(m)_R/G/B received by the second control circuit 120 of the driving circuit 100 is decided by the gray level to be displayed by the sub-pixel.

Figure 2:
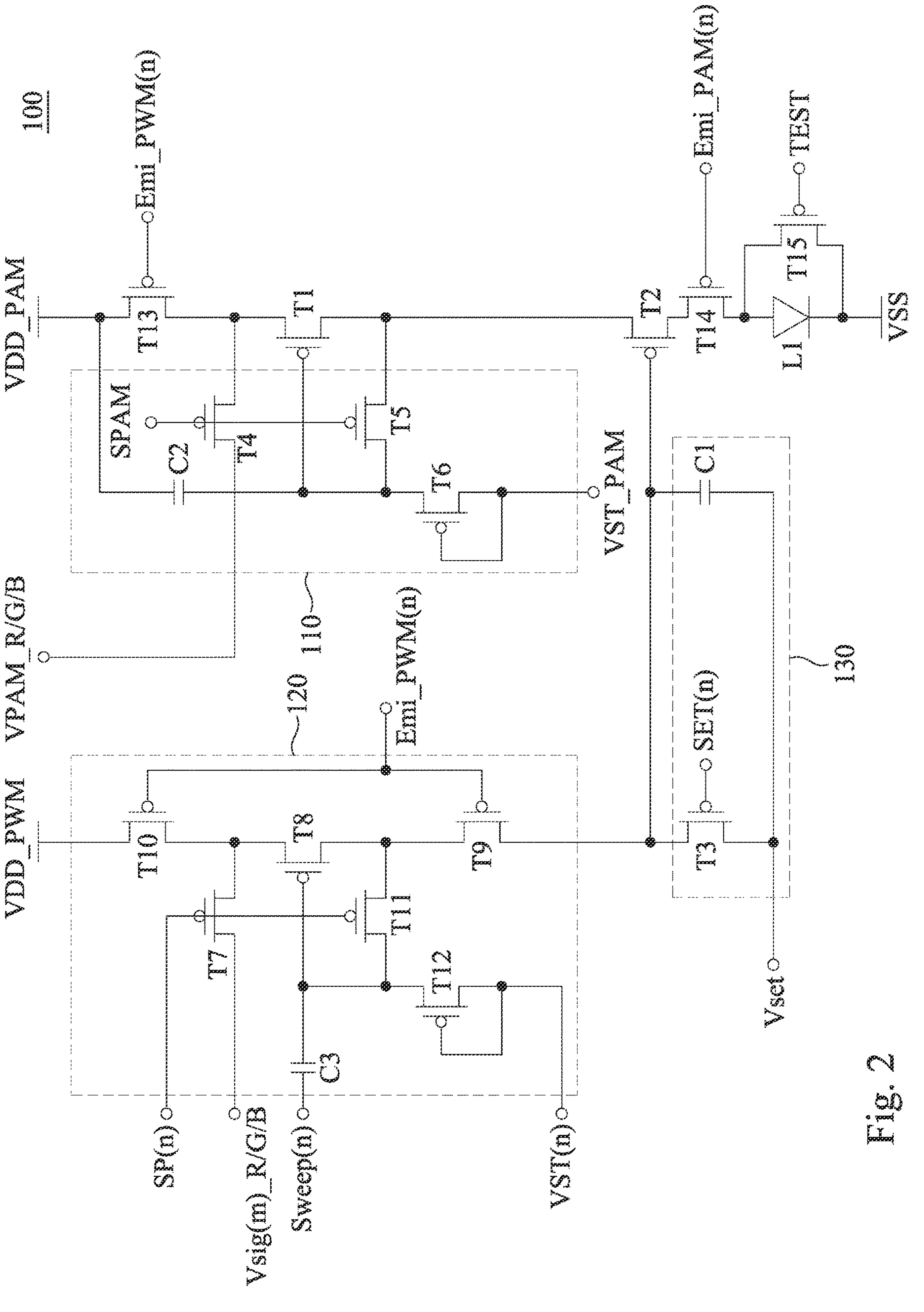
FIG. 2 is a circuit diagram of one of driving circuits and one of light emitting elements in accordance with some embodiments of the present disclosure.

Specifically, reference is made to FIG. 2. FIG. 2 is a circuit diagram of one of driving circuits 100 and one of light emitting elements L1 in accordance with some embodiments of the present disclosure. The first control circuit 110 includes a fourth transistor T4, a fifth transistor T5, a sixth transistor T6 and a second capacitor C2. A first terminal of the second capacitor C2 is electrically coupled to a first system high voltage terminal VDD_PAM, a second terminal of the second capacitor C2 is electrically coupled to the gate terminal of the first transistor T1. A first terminal of the fourth transistor T4 is configured to receive a corresponding one of the first data signals VPAM_R/G/B, a second terminal of the fourth transistor T4 is electrically coupled to the first terminal of the first transistor T1, and a gate terminal of the fourth transistor T4 is configured to receive the second control signal SPAM.

A first terminal of the fifth transistor T5 is electrically coupled to the gate terminal of the first transistor T1, a second terminal of the fifth transistor T5 is electrically coupled to the second terminal of the first transistor T1, a gate terminal of the fifth transistor T5 is configured to receive the second control signal SPAM. A first terminal of the sixth transistor T6 is electrically coupled to the first terminal of the fifth transistor T5, a second terminal of the sixth transistor T6 is configured to receive the third control signal VST_PAM, and a gate terminal of the sixth transistor T6 is configured to receive the third control signal VST-_PAM.

The second control circuit 120 includes a seventh transistor T7, an eighth transistor T8, an ninth transistor T9, a tenth transistor T10, an eleventh transistor T11, a twelfth transistor T12 and the third capacitor C3. A first terminal of the seventh transistor T7 is configured to receive the corresponding one of the second data signals Vsig(m)_R/G/B, a gate terminal of the seventh transistor T7 is configured to receive the fourth control signal SP(n). A first terminal of the eighth transistor T8 is electrically coupled to a second terminal of the seventh transistor T7.

A first terminal of the ninth transistor T9 is electrically coupled to a second terminal of the eighth transistor T8, a second terminal of the ninth transistor T9 is electrically coupled to the gate terminal of the second transistor T2, and a gate terminal of the ninth transistor T9 is configured to receive the fifth control signal Emi_PWM(n). A first terminal of the tenth transistor T10 is electrically coupled to a second system high voltage terminal VDD_PWM, a second terminal of the tenth transistor T10 is electrically coupled to the second terminal of the seventh transistor T7 and the first terminal of the eighth transistor T8, a gate terminal of the tenth transistor T10 is configured to receive the fifth control signal Emi_PWM(n).

A first terminal of the third capacitor C3 is configured to receive the sweep signal Sweep(n), a second terminal of the third capacitor C3 is electrically coupled to the gate terminal of the eighth transistor T8. A first terminal of the eleventh transistor T11 is electrically coupled to a second terminal of the third capacitor C3 and the gate terminal of the eighth transistor T8, a second terminal of the eleventh transistor T11 is electrically coupled to the second terminal of the eighth transistor T8 and the first terminal of the ninth transistor T9, a gate terminal of the eleventh transistor T11 is configured to receive the fourth control signal SP(n). A first terminal of the twelfth transistor T12 is electrically coupled to the second terminal of the third capacitor C3, the gate terminal of the eighth transistor T8 and a first terminal of the eleventh transistor T11, a second terminal of the twelfth transistor T12 is configured to receive the sixth control signal VST(n), a gate terminal of the twelfth transistor T12 is configured to receive the sixth control signal VST(n).

The reset circuit 130 includes a third transistor T3 and a first capacitor C1. A first terminal of the third transistor T3 is electrically coupled to the gate terminal of the second transistor T2, a second terminal of the third transistor T3 is configured to receive the reset signal Vset, a gate terminal of the third transistor T3 is configured to receive the first control signal SET(n). A first terminal of the first capacitor C1 is electrically coupled to the gate terminal of the second transistor T2 and the first terminal of the third transistor T3, a second terminal of the first capacitor C1 is electrically coupled to the second terminal of the third transistor T3, and the second terminal of the first capacitor C1 is configured to receive the reset signal Vset.

A first terminal of the thirteenth transistor T13 is electrically coupled to the first system high voltage terminal VDD_PAM, a second terminal of the thirteenth transistor T13 is electrically coupled to the first terminal of the first transistor T1, and a gate terminal of the thirteenth transistor T13 is configured to receive the fifth control signal Emi_PWM(n). A first terminal of the first transistor T1 is electrically coupled to the second terminal of the thirteenth transistor T13, a second terminal of the first transistor T1 is electrically coupled to the first terminal of the second transistor T2, and a gate terminal of the first transistor T1 is electrically coupled to the first control circuit 110. A first terminal of the second transistor T2 is electrically coupled to a second terminal of the first transistor T1, a second terminal of the second transistor T2 is electrically coupled to the first terminal of the fourteenth transistor T14, and a gate terminal of the second transistor T2 is electrically coupled to the second control circuit 120. A first terminal of the fourteenth transistor T14 is electrically coupled to the second terminal of the second transistor T2, a gate terminal of the fourteenth transistor T14 is configured to receive the seventh control signal Emi_PAM(n).

A first terminal of the light emitting element L1 is electrically coupled to the second terminal of the fourteenth transistor T14, and a second terminal of the light emitting element L1 is electrically coupled to the system low voltage terminal VSS. A first terminal of the fifteenth transistor T15 is electrically coupled to the second terminal of the fourteenth transistor T14, a second terminal of the fifteenth transistor T15 is electrically coupled to the system low voltage terminal VSS, and a gate terminal of the fifteenth transistor T15 is configured to receive a control signal TEST. Before the light emitting element L1 is mounted, the fifteenth transistor T15 is configured to conduct the current path of the driving circuit 100 to determine whether the driving circuit 100 can operate in normal. The aforementioned transistors T1~T15 can be implemented by P-type transistor. However, it should not intend to limit the disclosure. In another embodiment, the person skilled in the art can replace the aforementioned transistors T1~T15 by N-type transistor or other switch elements with the similar functions, and accordingly adjust the system voltages (such as, the first system high voltage terminal VDD_PAM, the second system high voltage terminal VDD_PWM and the system low voltage terminal VSS), control signals (such as, the first control signal SET(n), the third control signal VST_PAM, the fourth control signal SP(n), the fifth control signal Emi_PWM(n) and the sixth control signal VST(n)) and the data signals, in order to achieve the functions of the present disclosure.

Figure 3:
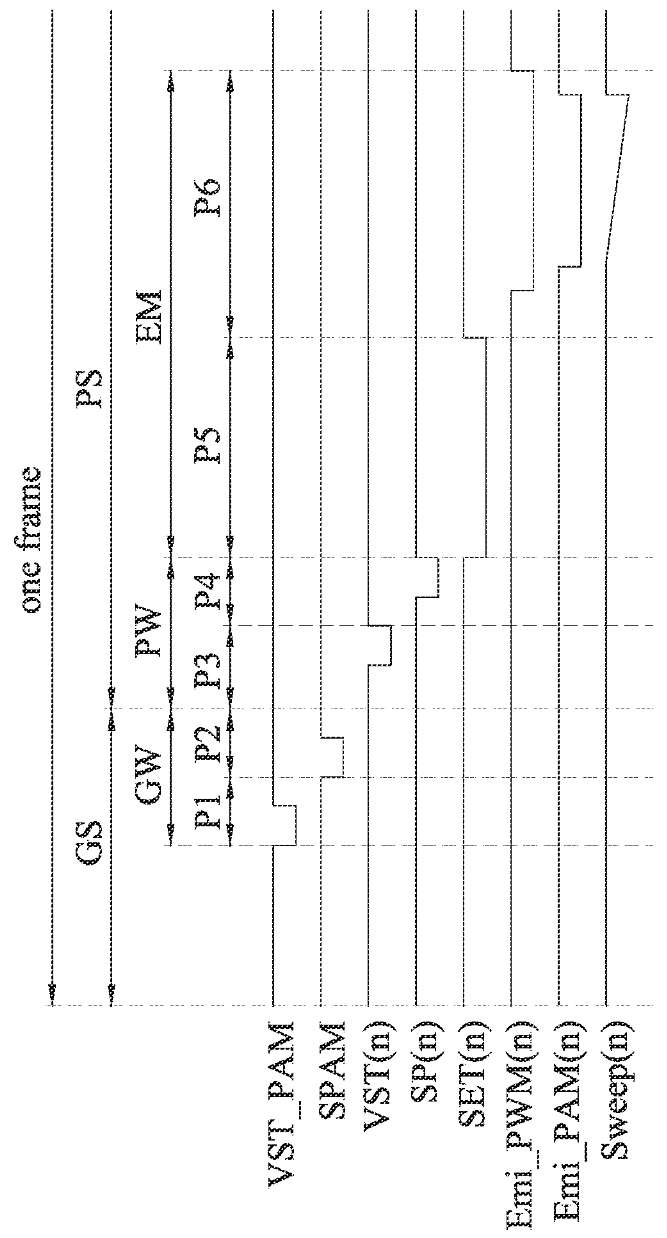
FIG. 3 is a timing diagram of control signals of one of driving circuits in FIG. 2 during a global scanning period and a progressive scanning period.

For better understanding the operation of the driving circuit 100, reference is made to FIG. 3. FIG. 3 is a timing diagram of control signals of one of driving circuits 100 in FIG. 2. The operation timing of the driving circuit 100 includes a global scanning period GS and a progressive scanning period PS. As shown in FIG. 3, the global scanning period GS includes a first writing period GW, the progressive scanning period PS includes a second writing period PW and a reset and an emission period EM. The first writing period GW includes a first period P1 and a second period P2. The second writing period PW includes a third period P3 and a fourth period P4. The reset and emission period EM includes a fifth period P5 (which can be considered as a reset period) and a sixth period P6 (which can be considered as an emission period). To be noted that, the time length of the periods in FIG. 3 are only for examples, it should not intend to limit the present disclosure.

In one frame of the operation timing of the driving circuit 100 can include multiple of reset and emission periods EM. As a result, during each of the reset and emission periods EM in one frame, the emission time length of the light emitting element L1 can be controlled, in order to control the gray level to be displayed by the light emitting element L1.

In other words, once the driving circuit 100 receive the corresponding one of the first data signals VPAM_R/G/B and the corresponding one of the second data signals Vsig (m)_R/G/B, the driving circuit 100 can repeat the multiple of the reset and emission periods EM in the following periods.

That is, the operation timing of the driving circuit 100 can includes the first writing period GW (which can be considered as a global writing period), the second writing period PW (which can be considered as a progressive writing period) and multiple of the reset and emission periods EM (such as, 13 reset and emission periods EM in one frame), and each of the reset and emission periods EM includes the fifth period P5 (the reset period) and the sixth period P6 (the emission period).

Specifically, during the first period P1, the third control signal VST_PAM has a first logical level (such as, the low logic level), and during the second period P2 to the sixth period P6, the third control signal VST_PAM has a second logical level (such as, the high logic level). During the second period P2, the second control signal SPAM has the low logic level; and during the first period P1, the third period P3 to the sixth period P6, the second control signal SPAM has the high logic level. During the third period P3, the sixth control signal VST(n) has the low logic level; and during the first period P1, the second period P2 and the fourth period P4 to the sixth period P6, the sixth control signal VST(n) has the high logic level. During the fourth period P4, the fourth control signal SP(n) has the low logic level; and during the first period P1 to the third period P3, the fifth period P5 and the sixth period P6, the fourth control signal SP(n) has the high logic level.

During the fifth period P5, the first control signal SET(n) has the low logic level; and during the first period P1 to the fourth period P4 and the sixth period P6, the sixth period P6 has the high logic level. During the sixth period P6, the fifth control signal Emi_PWM(n) has the low logic level; and during the first period P1 to the fifth period P5, the fifth control signal Emi_PWM(n) has the high logic level. During the sixth period P6, the seventh control signal Emi_PAM(n) has the low logic level; and during the first period P1 to the fifth period P5, the seventh control signal Emi_PAM(n) has the high logic level. During the sixth period P6, the sweep signal Sweep(n) is gradually pulled down from the high logic level to the low logic level; and during the first period P1 to the fifth period P5, the sweep signal Sweep(n) has the high logic level.

During the first period P1, since the third control signal VST_PAM has the low logic level, the sixth transistor T6 conducts. On the other hand, since the second control signal SPAM has the high logic level, the fourth transistor T4 and the fifth transistor T5 turns off. In additional, in the first period P1, the time length during the third control signal VST_PAM at the low logic level can be one time unit (such as, 10 μs).

Specifically, in the first period P1, the third control signal VST_PAM is transmitted through the sixth transistor T6 to the second terminal of the second capacitor C2, such that the voltage level at the second terminal of the second capacitor C2 is pulled down to the low logic level.

In the second period P2, since the second control signal SPAM has the low logic level, the fourth transistor T4 and the fifth transistor T5 conducts. On the other hand, since the third control signal VST_PAM has the high logic level, the sixth transistor T6 turns off, such that the voltage level at the second terminal of the second capacitor C2 is maintained at the low logic level, same as the initial of the second period P2. In additional, in the second period P2, the time length during the second control signal SPAM at the low logic level can be one time unit (such as, 10 μs).

Specifically, in the initial of the first period P1, since the voltage level at the second terminal of the second capacitor C2 is maintained at the low logic level, the first transistor T1 conducts. And then, the corresponding one of the first data signals VPAM_R/G/B is transmitted through the fourth transistor T4, the first transistor T1 and the fifth transistor T5 to the gate terminal of the first transistor T1 until the first transistor T1 cuts off. Meanwhile, since the second terminal of the second capacitor C2 is electrically coupled to the gate terminal of the first transistor T1, the voltage level at the gate terminal of the first transistor T1 is maintained and stored by the second capacitor C2, such that the first transistor T1 can control/adjust the pulse amplitude of the driving current in the following reset and emission periods EM.

In other words, during the first period P1 of the first writing period GW, the driving circuit 100 reset the voltage level at the gate terminal of the first transistor T1. And, during the second period P2 of the first writing period GW, the corresponding one of the first data signals VPAM_R/G/B is written into the first control circuit 110 and to compensate the threshold voltage of the first transistor T1 also. That is, the first period P1 is the reset period of the first transistor T1, the second period P2 is the writing and compensation period of the first transistor T1.

In the third period P3, since the sixth control signal VST(n) has the low logic level, the twelfth transistor T12 and the eighth transistor T8 conducts. On the other hand, since the fifth control signal Emi_PWM(n) and the fourth control signal SP(n) have the high logic level, the tenth transistor T10, the ninth transistor T9, the seventh transistor T7 and the eleventh transistor T11 turn off. In additional, in the third period P3, the time length during the sixth control signal VST(n) at the low logic level can be one time unit (such as, 10 μs).

Specifically, in the third period P3, the sixth control signal VST(n) is transmitted through the twelfth transistor T12 to the second terminal of the third capacitor C3, such that the voltage level at the second terminal of the third capacitor C3 is stored at the low logic level.

In the fourth period P4, since the fourth control signal SP(n) has the low logic level, the seventh transistor T7 and the eleventh transistor T11 conducts. On the other hand, since the sixth control signal VST(n) has the high logic level, the twelfth transistor T12 turns off. In additional, the fourth period P4, the time length during the fourth control signal SP(n) at the low logic level can be one time unit (such as, 10 μs).

Specifically, in the fourth period P4, since the second terminal of the third capacitor C3 is maintained at the low logic level, the eighth transistor T8 conducts. And, the corresponding one of the second data signals Vsig(m)_R/G/B is transmitted through the seventh transistor T7, the eighth transistor T8 and the eleventh transistor T11 to the gate terminal of the eighth transistor T8 until the eighth transistor T8 cuts off.

In other words, during the third period P3 of the second writing period PW, the driving circuit 100 resets the voltage level at the gate terminal of the eighth transistor T8. And, during the fourth period P4 of the second writing period PW, the corresponding one of the second data signals Vsig(m)_R/G/B is written into the second control circuit 120, and to compensate the threshold voltage of the eighth transistor T8 also. That is, the third period P3 is the reset period of the eighth transistor T8, the fourth period P4 is the writing and compensation period of the eighth transistor T8.

To be noted that, since the first control circuit 110 and the second control circuit 120 are respectively receive the corresponding one of the first data signals VPAM_R/G/B and the corresponding one of the second data signals Vsig(m)_R/G/B according to the second control signal SPAM and the fourth control signal SP(n). Therefore, the corresponding one of the first data signals VPAM_R/G/B and the corresponding one of the second data signals Vsig(m)_R/G/B can be written to the driving circuit 100 at different time periods, instead of at the same time.

And, the second capacitor C2 of the first control circuit 110 stores the voltage level after the corresponding one of the first data signals VPAM_R/G/B is written to the first control circuit 110 during the first writing period GW, and the third capacitor C3 of the second control circuit 120 stores the voltage level after the corresponding one of the second data signals Vsig(m)_R/G/B is written to the second control circuit 120 during the second writing period PW. Therefore, the first writing period GW and the second writing period PW of the driving circuit 100 can operate isolated. Furthermore, in some embodiments, the time interval between the first writing period GW and the second writing period PW may be longer, the said time interval can be occupied by the reset and emission periods EM, in order to increase the ratio of the reset and emission period EM occupied in one frame.

In the fifth period P5, since the first control signal SET(n) has the low logic level, the third transistor T3 conducts. Specifically, during the fifth period P5, the reset signal Vset is transmitted through the third transistor T3 to the gate terminal of the second transistor T2 and the first terminal of the first capacitor C1. Therefore, the voltage level at the first terminal of the first capacitor C1 is stored at the low logic level, and the second transistor T2 conducts. In additional, during the fifth period P5, the time length during the first control signal SET(n) at the low logic level can be four time units (such as, 4*10 μs=40 μs). In some embodiments, the reset signal Vset can be −3 volts.

In the sixth period P6 (the emission period), since the fifth control signal Emi_PWM(n) and the seventh control signal Emi_PAM(n) have the low logic level, the tenth transistor T10, the ninth transistor T9, the thirteenth transistor T13 and the fourteenth transistor T14 conduct, such that the driving current is transmitted through the thirteenth transistor T13, the first transistor T1, the second transistor T2 and the fourteenth transistor T14 to the system low voltage terminal VSS. In additional, during the sixth period P6, the fifth control signal Emi_PWM(n) at the low logic level can be six time units (such as, 6*10 μs 60 μs). During the sixth period P6, the seventh control signal Emi_PAM(n) at the low logic level can be five time units (such as, 5*10 μs 50 μs).

To be noted that, the difference of the time length, such as 10 μs, between the fifth control signal Emi_PWM(n) and the seventh control signal Emi_PAM(n) at the low logic level is only to control the pulse amplitude of the driving current during the low gray level. Therefore, the fifth control signal Emi_PWM(n) of the present can be implemented by the seventh control signal Emi_PAM(n). In additional, in some embodiments, during the sixth period P6 (the emission period), the time lengths of the fifth control signal Emi_PWM(n) and the seventh control signal Emi_PAM(n) at the low logic level are same. For example, during the sixth period P6, the time length of the seventh control signal Emi_PAM(n) at the low logic level can be six time units (such as, 6*10 μs=60 μs).

And, during the sixth period P6 (the emission period), the waveform of the sweep signal Sweep(n) can be a triangular wave, an oblique wave or a sawtooth wave.

As a result, the second control circuit 120 can control the second transistor T2 according to the corresponding one of the second data signals Vsig(m)_R/G/B, in order to adjust the pulse width of driving current during the sixth period P6 (the emission period).

During the sixth period P6 (the emission period), the sweep signal Sweeep(n) received by the first terminal of the third capacitor C3 gradually pulls down the voltage level at the gate terminal of the eighth transistor T8, through capacitive coupling effect, until the eighth transistor T8 conducts according to the corresponding one of the second data signals Vsig(m)_R/G/B and the sweep signal Sweeep(n), such that the voltage of the second system high voltage terminal is transmitted through the tenth transistor T10, the eighth transistor T8, the ninth transistor T9 to the gate terminal of the second transistor T2, so as to turn off the second transistor T2.

That is, during the initial (such as when the seventh control signal Emi_PAM(n) at the low logic level) of the sixth period P6 (the emission period), the thirteenth transistor T13, the first transistor T1, the second transistor T2 and the fourteenth transistor T14 are conductive, such that the driving circuit 100 starts to generate the driving current. And then, the second control circuit 120 turns off the second transistor T2 according to the corresponding one of the second data signals Vsig(m)_R/G/B and the sweep signals Sweep(n), so as to stop the driving circuit 100 generating the driving current. The time length from aforementioned start to stop generating the driving current can be considered as the pulse width of the driving current.

That is, in the sixth period P6 (the emission period) of the reset and emission period EM, in response to the seventh control signal Emi_PAM(n) at the low logic level, the driving circuit 100 starts to generating the driving current, and then, the second transistor T2 will be turned off, according to the corresponding one of the second data signals Vsig(m)_R/G/B corresponding to a gray level, to stop generating the driving current.

That is, in the sixth period P6 (the emission period) of the reset and emission period EM, the voltage level at the gate terminal of the eighth transistor T8 in the driving circuit 100 is linear with the voltage level of the sweep signal Sweep(n), such that the eighth transistor T8 can determine the timing for tuning off the second transistor T2 according to the corresponding one of the second data signals Vsig(m)_R/G/B written in the fourth period P4, to control the pulse width of the driving current.

For example, if the gray level to be displayed by the light emitting element L1 is high gray level, in the fourth period P4 of the second writing period PW, the voltage(/absolute voltage) of the corresponding one of the second data signals Vsig(m)_R/G/B is larger(/smaller), the voltage level at the gate terminal of the eighth transistor T8 is relatively high, and the voltage level at the second terminal of the third capacitor C3 is also relatively high. Therefore, in the sixth period P6 (the emission period) of the reset and emission period EM, since the voltage level at the gate terminal of the eighth transistor T8 is relatively high, the oblique wave of the sweep signal Sweep(n) will spend more time to pull down the voltage level at the gate terminal of the eighth transistor T8 until the eighth transistor T8 conducts. And, when the eighth transistor T8 conducts, the voltage of a second system high voltage terminal VDD_PWM is transmitted through the tenth transistor T10, the eighth transistor T8 and the ninth transistor T9 to the second transistor T2, so as to turn off the second transistor T2.

In this case, during the sixth period P6 (the emission period), the rime length that the second transistor T2 is conductive is relatively longer. That is, the pulse width of the driving current is relatively large, such that the emission time of the light emitting element L1 longer. And, since the driving circuit 100 generates the driving currents with same pulse width during each of the sixth periods P6 (the emission periods) in one frame, the gray level displayed by light emitting element L1 is relatively high.

On the other hand, if the gray level to be displayed by the light emitting element L1 is low gray level, in the fourth period P4 of the second writing period PW, the voltage(/absolute voltage) of the corresponding one of the second data signals Vsig(m)_R/G/B is smaller(/larger), the voltage level at the gate terminal of the eighth transistor T8 is relatively low, and the voltage level at the second terminal of the third capacitor C3 is also relatively low. Therefore, in the sixth period P6 (the emission period) of the reset and emission period EM, since the voltage level at the gate terminal of the eighth transistor T8 is relatively high, the oblique wave of the sweep signal Sweep(n) will spend less time to pull down the voltage level at the gate terminal of the eighth transistor T8 until the eighth transistor T8 conducts. And, when the eighth transistor T8 conducts, the voltage of the second system high voltage terminal VDD_PWM is transmitted through the tenth transistor T10, the eighth transistor T8 and the ninth transistor T9 to the second transistor T2, so as to turn off the second transistor T2.

In this case, during the sixth period P6 (the emission period), the rime length that the second transistor T2 is conductive is shorter. That is, the pulse width of the driving current is relatively small, such that the emission time of the light emitting element L1 is shorter. And, since the driving circuit 100 generates the driving currents with same pulse width during each of the sixth periods P6 (the emission periods) in one frame, the gray level displayed by light emitting element L1 is relatively low.

Figure 4:
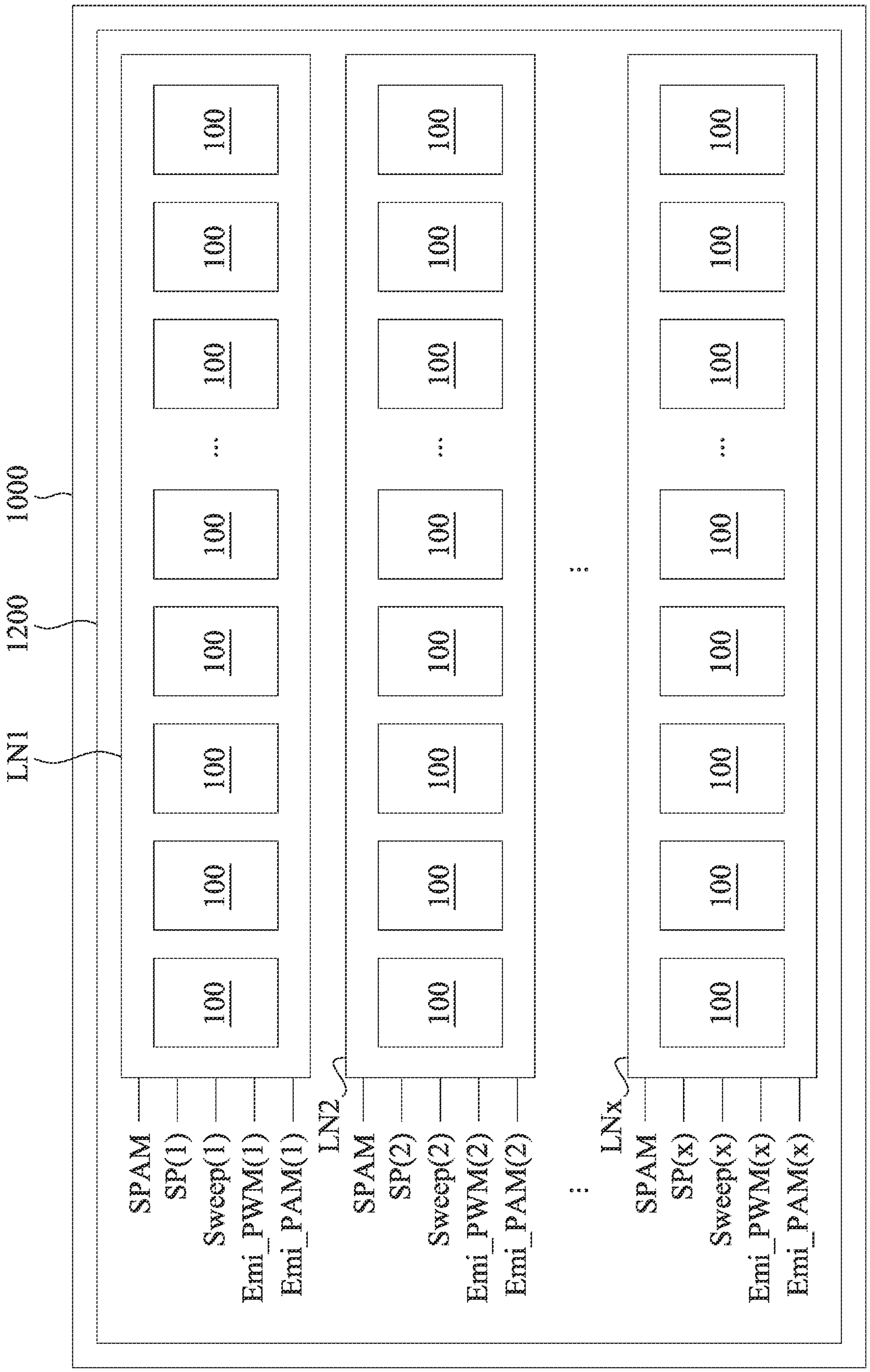
FIG. 4 is a schematic diagram of a display device in accordance with some embodiments of the present disclosure.

Reference is made to FIG. 4, also. FIG. 4 is a schematic diagram of a display device 1000 in accordance with some embodiments of the present disclosure. As shown in FIG. 4, the display device 1000 includes the display panel 1200. In some embodiments, the display device 1000 has one display panel 1200. In other embodiments, the display device 1000 is assembled by multiple of the display panels. Therefore, it should not intend to limit the disclosure.

The display panel 1200 includes the driving circuits 100 respectively arranged in a first sub-pixel line LN1 to a xth sub-pixel line LNx, each of the driving circuits 100 is configured to drive the light emitting element L1 (as shown in FIG. 1, not shown in FIG. 4) in the same sub-pixel. Each of the driving circuits 100 in FIG. 4 can be implemented by the driving circuit 100 in FIG. 1. And, in the driving circuit 100 as shown in FIG. 1, the "n" of the sixth control signal VST(n), the fourth control signal SP(n), the first control signal SET(n), the fifth control signal Emi_PWM(n), the seventh control signal Emi_PAM(n) and the sweep signal Sweep(n) can be any positive integer.

As shown in FIG. 4, the driving circuits 100 in the same sub-pixel line are configured to receive the same control signal. For example, the driving circuits 100 in the first sub-pixel line LN1 are configured to receive the second control signal SPAM, a fourth control signal SP(1), a sixth control signal VST(1) (not shown), a first control signal SET(1) (not shown), a sweep signal Sweep(1), a fifth control signal Emi_PWM(1) and a seventh control signal Emi_PAM (1).

The driving circuits 100 of the second sub-pixel line LN2 are configured to receive the second control signal SPAM, a fourth control signal SP(2), a sixth control signal VST(2) (not shown), a first control signal SET(2) (not shown), a sweep signal Sweep(2), a fifth control signal Emi_PWM(2) and a seventh control signal Emi_PAM(2); and so on.

To be noted that, during the reset and emission period EM, the driving circuits 100 receive the sweep signal Sweep(n), and start or stop generating the driving current according to the corresponding one of the first data signals VPAM_R/G/B, so as to adjust the pulse width of the driving current.

Therefore, the display device 1000 of the present disclosure respectively provide the corresponding sweep signals Sweep(1)~Sweep(x) to the driving circuits 100 in the first sub-pixel line LN1 to the xth sub-pixel line LNx, such that the light emitting elements corresponding to the driving circuits 100 in different lines can emit at different reset and emission periods EM.

Figure 5:
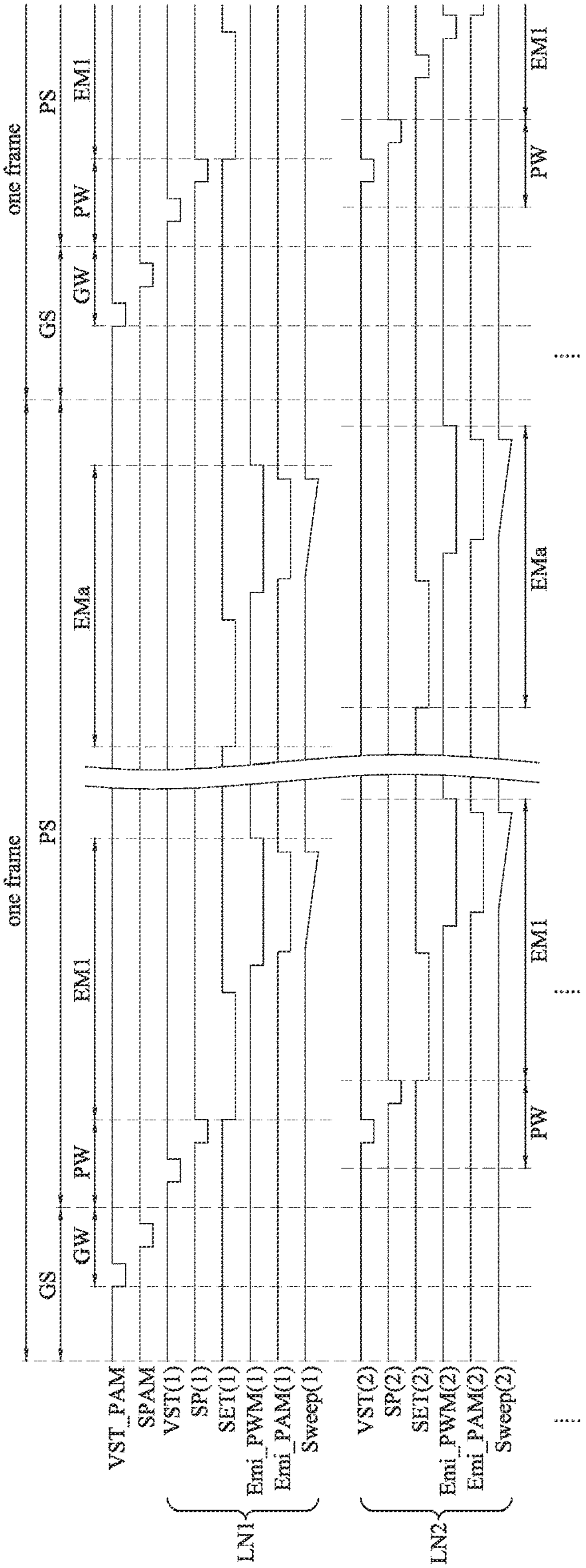
FIG. 5 is a timing diagram of control signals of the display device in FIG. 4.

Reference is also made to FIG. 5. FIG. 5 is a timing diagram of control signals of the display device 1000 in FIG. 4. As shown in FIG. 5, one frame of the operation timing of the display device 1000 can be divided to the global scanning period GS and the progressive scanning period PS, also. The global scanning period GS includes the first writing period GW. The progressive scanning period PS includes the second writing period PW and the reset and emission periods EM~EMa. To be noted that, the time lengths in FIG. 5 are only for examples, it should not intend to limit the disclosure. The global scanning period GS in FIG. 5 is similar with the global scanning period GS in FIG. 3. The second writing period PW and the reset and emission periods EM1~EMa of the progressive scanning period PS in FIG. 5 are respectively similar with the second writing period PW and the reset and emission period EM in FIG. 3. And, FIG. 3 illustrates control signals of only one driving circuit 100, FIG. 5 illustrates control signals of multiples of driving circuits 100 in the first sub-pixel line LN1 to the xth sub-pixel line LNx.

In the first writing period GW of the global scanning period GS, all the driving circuit 100 receive the first data signals VPAM_R/G/B according to the second control signal SPAM and the color of each sub-pixels, respectively.

That is, in the first writing period GW of the global scanning period GS, the second control signal SPAM has a first logic level (such as, a low logic level), the display device 1000 simultaneously provides/writes the first data signals VPAM_R/G/B to the first control circuit 110 of each of the driving circuit 100 in the first sub-pixel line LN1 to the xth sub-pixel line LNx.

In the second writing period PW of the progressive scanning period PS, the driving circuits 100 in the first sub-pixel line LN1 receive the second data signals Vsig(m)_R/G/B according to the fourth control signal SP(1) and the gray level to be displayed by each of sub-pixels; the driving circuits 100 in the second sub-pixel line LN2 receive the second data signals Vsig(m)_R/G/B according to the fourth control signal SP(2) and the gray level to be displayed by each of sub-pixels; and so on.

Specifically, in the reset and emission periods EM1~EMa of the progressive scanning period PS, the pulse of the fourth control signal SP(1) can be one time unit (such as, 10 μs) earlier to the pulse of the fourth control signal SP(1); the pulse of the fourth control signal SP(3) (not shown) can be one time unit (such as, 10 μs) earlier to the pulse of the fourth control signal SP(2); and so on. The pulse of the fourth control signal SP(x−1) (not shown) can be one time unit (such as, 10 μs) earlier to the pulse of the fourth control signal SP(x) (not shown). As a result, during the progressive scanning period PS, the driving circuits 100 in different sub-pixel lines have different second writing periods PW. Therefore, during the progressive scanning period PS, the display device 1000 sequentially provides/writes multiple of the second data signals Vsig(m)_R/G/B to the driving circuits 100 in the first sub-pixel line LN1 to the xth sub-pixel line LNx.

In other words, in the progressive scanning period PS, the fourth control signals SP(1)~SP(x) have the low logic level during the second writing periods PW of each of the driving circuits 100 in the first sub-pixel line LN1 to the xth sub-pixel line LNx. The display device 1000 sequentially provides/writes multiple of the second data signals Vsig(m)_R/G/B to the second control circuit 120 of each of the driving circuits 100.

In the progressive scanning period PS, the driving circuits 100 in the first sub-pixel line LN1 are configured to receive the sweep signal Sweep(1), during the reset and emission period EM1 of the driving circuits 100 in the first sub-pixel line LN1, and each of the driving circuits 100 in the first sub-pixel line LN1 controls the pulse width of the driving current generated by itself, according to the corresponding one of the second data signals Vsig(m)_R/G/B. In the progressive scanning period PS, the driving circuits 100 in a second sub-pixel line LN2 are configured to receive the sweep signal Sweep(2), during the reset and emission period EM1 of the driving circuits 100 in the second sub-pixel line LN2, and each of the driving circuits 100 in the first sub-pixel line LN2 controls the pulse width of the driving current generated by itself, according to the corresponding one of the second data signals Vsig(m)_R/G/B; and so on. In the progressive scanning period PS, the driving circuits 100 in the xth sub-pixel line LNx are configured to receive the sweep signal Sweep(x), during the reset and emission period EM1 of the driving circuits 100 in the xth sub-pixel line LNx, and each of the driving circuits 100 in the xth sub-pixel line LNx controls the pulse width of the driving current generated by itself, according to the corresponding one of the second data signals Vsig(m)_R/G/B.

Specifically, in one of the reset and emission period EM1~EMa of the progressive scanning period PS, the pulse of the sweep signal Sweep(1) (as the sawtooth wave shown in FIG. 5) can be one time unit earlier to the pulse of the sweep signal Sweep(2); the pulse of the sweep signal Sweep(2) can be one time unit earlier to the pulse of the sweep signal Sweep(3) (not shown); and so on. The pulse of the sweep signal Sweep(x−1) (not shown) can be one time unit earlier to the pulse of the sweep signal Sweep(x) (not shown). As a result, in the progressive scanning period PS, the driving circuits 100 in a sub-pixel line LN1 to xth sub-pixel line LNx have the reset and emission periods EM at different time points. Therefore, in the progressive scanning period PS, each of the driving circuits 100 in the first sub-pixel line LN1 to the xth sub-pixel line LNx can provides the driving current generated by itself to the corresponding light emitting element L1. That is, each of the driving circuits 100 in the first sub-pixel line LN1 to the xth sub-pixel line LNx provides the driving current to the corresponding light emitting element L1 at different time points.

That is, in the progressive scanning period PS, the driving circuits 100 in different lines (e.g. the first sub-pixel line LN1 to the xth sub-pixel line LNx) respectively receive the sweep signal Sweep(1)~Sweep(x), so as to control the pulse width of the driving currents during the reset and emission periods EM1~EMa of each of the driving circuits 100. The reset and emission periods EM2, EM3~EMa−1 and EMa are similar with the reset and emission period EM1, and thus the explanations are omitted.

Figure 6:
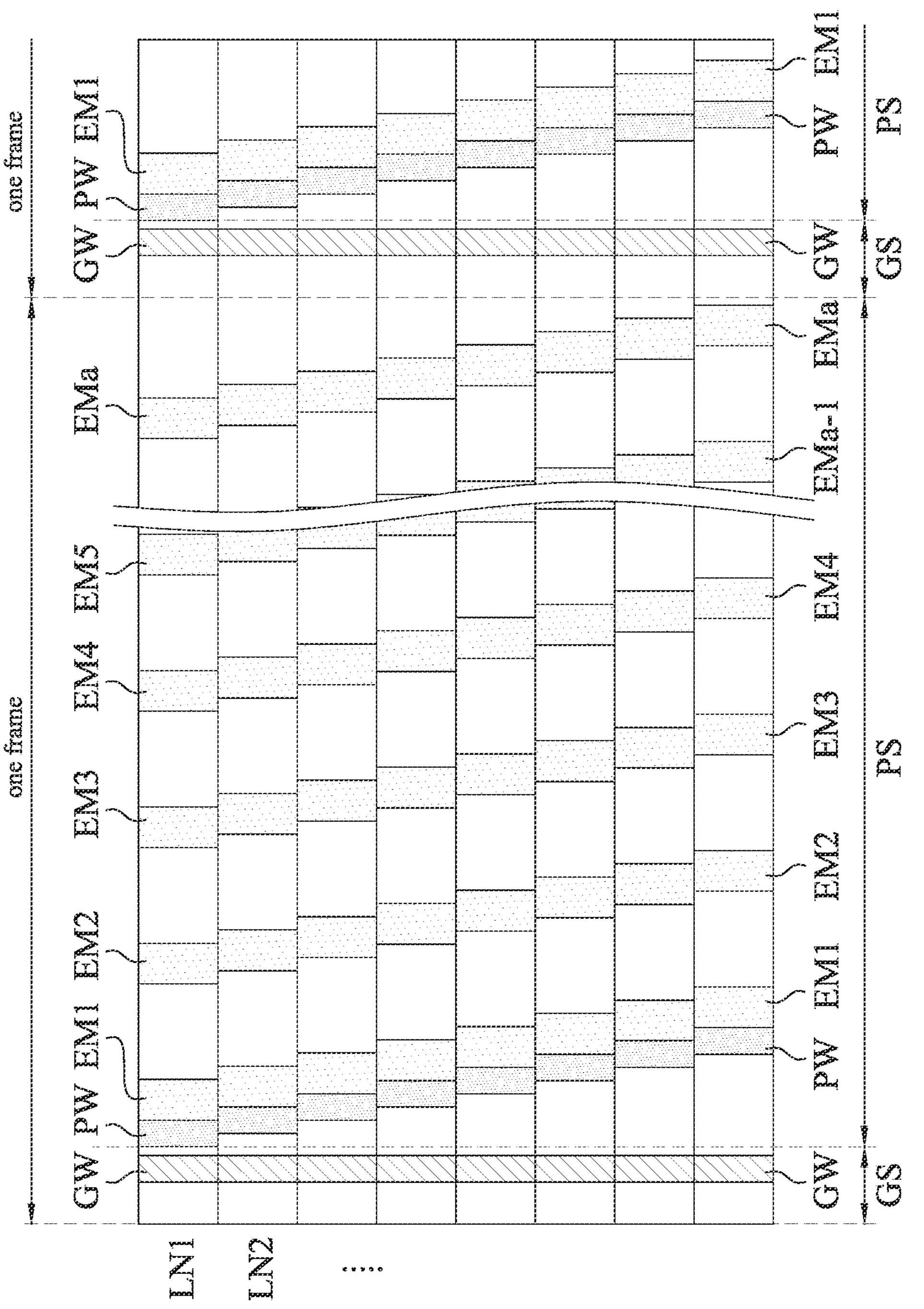
FIG. 6 is a timing diagram of the control signals in FIG. 5.

Specifically, reference is also made to FIG. 6. FIG. 6 is a timing diagram of the control signals in FIG. 5. As shown in FIG. 6, slash areas represent the first writing period GW, dense dot areas represent the second writing periods PW, and sparse dot area represent the reset and emission period EM1~EMa. Each of the reset and emission period EM1~EMa has the fifth period P5 (not shown in FIG. 6) and the sixth period P6 (not shown in FIG. 6).

To be noted that, each of the reset and emission period EM1~EMa does not represent the actual time length that the driving circuit 100 generates the driving current. The fifth period P5 in each the reset and emission periods EM1~EMa represents the time period for resetting the voltage level at the gate terminal of the second transistor T2 in the corresponding driving circuit 100. And the sixth period P6 in each the reset and emission periods EM1~EMa represents the time period in which the corresponding driving circuit 100 can generate the driving current.

In one frame, the driving circuits 100 in the same line of the display device 1000 includes one first writing period GW, one second writing period PW and multiple of reset and emission periods EM1~EMa. The first writing periods GW of the driving circuits 100 in different lines (e.g. the first sub-pixel line LN1 to the xth sub-pixel line LNx) are at the same time, the second writing periods PW of the driving circuits 100 in different lines (e.g. the first sub-pixel line LN1 to the xth sub-pixel line LNx) are at different time phases, and the reset and emission period EM1~EMa of each of the driving circuits 100 in different lines (e.g. the first sub-pixel line LN1 to the xth sub-pixel line LNx) are also at different time phases. In some embodiments, the “a” of the reset and emission period EMa can be implemented by 13, that is the number of the reset and emission period EM1~EMa can be 13.

Since the third control signal VST_PAM or the second control signal SPAM is simultaneously provided to the driving circuits 100 in different lines (e.g. the first sub-pixel line LN1 to the xth sub-pixel line LNx) by the display device 1000. Therefore, the first writing periods GW of the driving circuits 100 in different lines (e.g. the first sub-pixel line LN1 to the xth sub-pixel line LNx) are at the same time.

Since the sixth control signal VST(1)~VST(x) (not shown) or the fourth control signal SP(1)~SP(x) (not shown) are progressively provided to the driving circuits 100 in different lines (e.g. the first sub-pixel line LN1 to the xth sub-pixel line LNx) by the display device 1000. Therefore, the second writing periods PW of the driving circuits 100 in different lines (e.g. the first sub-pixel line LN1 to the xth sub-pixel line LNx) are at different time phases.

Since the sweep signals Sweep(1)~Sweep(x) (not shown), the fifth control signals Emi_PWM(1)~Emi_PWM(x) (not shown) or the seventh control signal Emi_PAM~Emi_PAM (x) are progressively provided to the driving circuits 100 in different lines (e.g. the first sub-pixel line LN1 to the xth sub-pixel line LNx) by the display device 1000. Therefore, the reset and emission periods EM1~EMa of the driving circuits 100 in different lines (e.g. the first sub-pixel line LN1 to the xth sub-pixel line LNx) are at different time phases.

Summary, the third control signal VST_PAM or the second control signal SPAM is simultaneously provided to the driving circuits 100 in different lines (e.g. the first sub-pixel line LN1 to the xth sub-pixel line LNx) by the display device 1000, such that the first data signals VPAM_R/G/B are simultaneously written into the driving circuits 100 in different lines (e.g. the first sub-pixel line LN1 to the xth sub-pixel line LNx). Furthermore, since the display device 1000 only provides the third control signal VST_PAM and the second control signal SPAM to write the first data signals VPAM_R/G/B into the riving circuits 100 in different lines (e.g. the first sub-pixel line LN1 to the xth sub-pixel line LNx), the circuits for generating the control signals can be decrease.

Since the first control circuit 110 of the driving circuit 100 can be implemented by the pulse amplitude adjustment circuit, and the second control circuit 120 can be implemented by the pulse width adjustment circuit. Therefore, the driving circuit 100 can control the gray level of the light emitting element better by controlling the pulse width of the driving current. And, the sweep signals Sweep(1)~Sweep(x) (not shown) are progressively provided to the riving circuits 100 in different lines (e.g. the first sub-pixel line LN1 to the xth sub-pixel line LNx) by the display device 1000, such that the second writing period PW of each of the driving circuits 100 may not be limited by others, and each of the driving circuits 100 generates the driving current in its own reset and emission periods EM1~EMa, in order to increase the ratio can be occupied by the reset and emission period EM in one frame.

In some usual cases, the driving circuit of part of the display device needs more transistors (e.g. 18 transistors) to achieve the effects similar with the driving circuit 100 of the present disclosure. In contrast, the driving circuit 100 of the present disclosure only utilizes 15 transistors to achieve the aforementioned operations, therefore the circuit area is relatively small, and the manufacturing cost can be decreased. In additional, in some usual cases, the driving current of the driving circuit of part of the display device has longer falling time (e.g. 18.9 μs). In contrast, the falling time of the driving current of the driving circuit 100 of present disclosure is shorter (e.g. 16.7 μs), and therefore the image uniformity of the display device 1000 in the low gray level can be increased.

And, in the second period P2, the first control circuit 110 of the display device 1000 can compensate the threshold voltage of the first transistor T1. In the fourth period P4, the second control circuit 120 can compensate the threshold voltage of the eighth transistor T8, and therefore the deviation from the pulse amplitude of the driving current caused by the variety in threshold voltage of the first transistor T1 generated from manufacture can be decreased, and the deviation from the pulse width of the driving current caused by the variety of threshold voltage of the eighth transistor T8 generated from the manufacture can be decreased, in order to increase the image uniformity.

Figure 7:
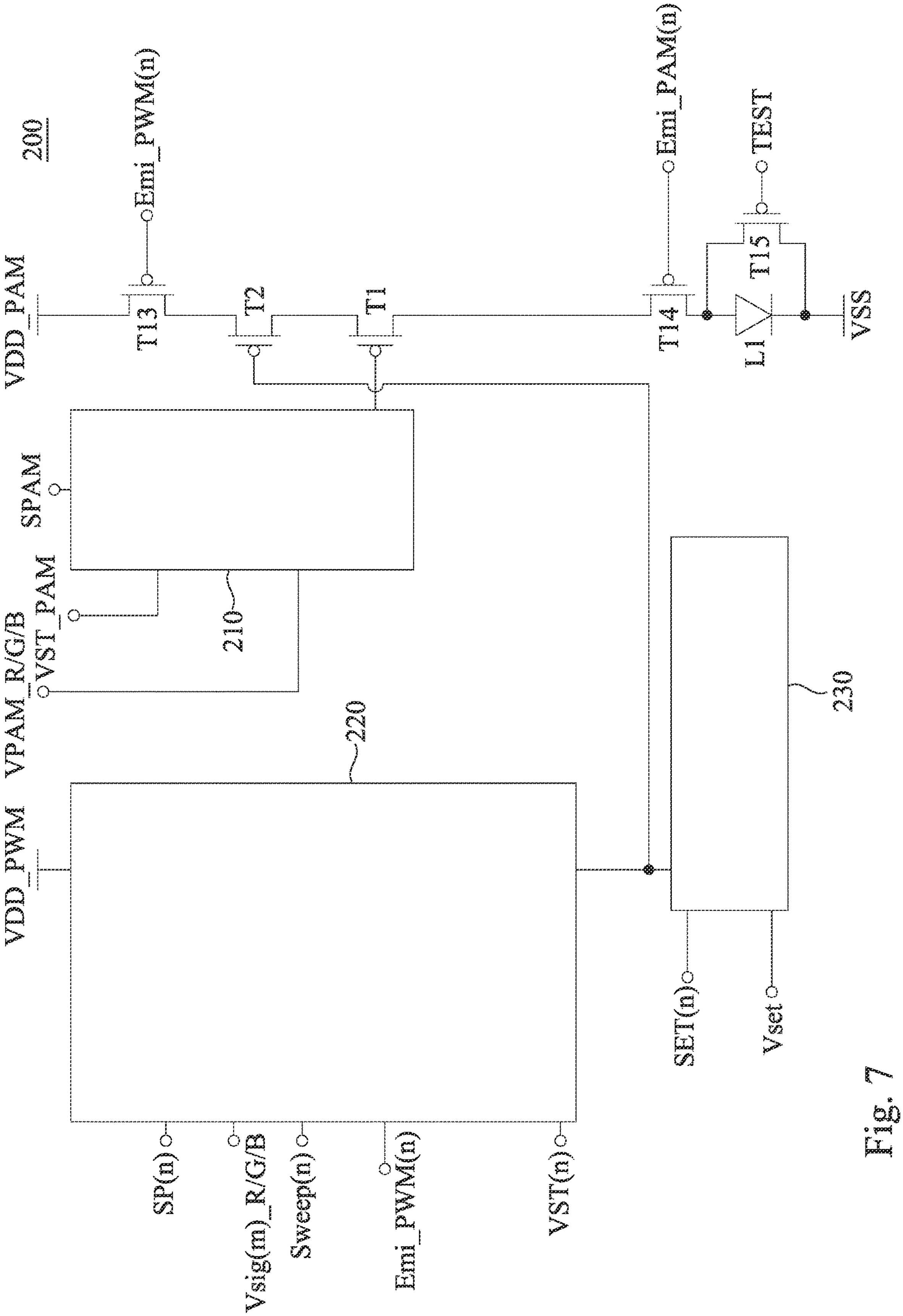
FIG. 7 is a functional block diagram of one of driving circuits and one of light emitting elements in accordance with some embodiments of the present disclosure.

Reference is made to FIG. 7. FIG. 7 is a functional block diagram of one of driving circuits 200 and one of light emitting elements L1 in accordance with some embodiments of the present disclosure. In the present disclosure, a display device can be constitute with multiple of sub-pixels, the display device may include multiple of driving circuits 200 and multiple of light emitting elements L1. For simplicity and clarity, FIG. 7 illustrates only one driving circuit 200 and one light emitting element L1. As shown in FIG. 7, the driving circuit 200 includes the first transistor T1, the second transistor T2, the first control circuit 210, the second control circuit 220 and the reset circuit 230. The driving circuit 200 further includes the thirteenth transistor T13, the fourteenth transistor T14 and the fifteenth transistor T15. The driving current generated by the driving circuit 200 flows from the first system high voltage terminal VDD_PAM through the thirteenth transistor T13, the second transistor T2, the first transistor T1, the fourteenth transistor T14 and the light emitting element L1 to the system low voltage terminal VSS.

The first control circuit 210 is electrically coupled to a gate terminal of the first transistor T1, and the first control circuit 210 is configured to adjust pulse amplitude of a driving current generated the driving circuit 200. The second control circuit 220 is electrically coupled to a gate terminal of the second transistor T2, and the second control circuit 220 is configured to adjust a pulse width of the driving current generated the driving circuit 200. The reset circuit 230 is electrically coupled to the gate terminal of the second transistor T2, and the reset circuit 230 is configured to reset the voltage level at the gate terminal of the second transistor T2.

The first transistor T1, the second transistor T2, the thirteenth transistor T13, the fourteenth transistor T14, the fifteenth transistor T15, the first control circuit 210, the second control circuit 220 and the reset circuit 230 of the driving circuit 200 of the embodiment shown in FIG. 7 are respectively similar to the first transistor T1, the second transistor T2, the thirteenth transistor T13, the fourteenth transistor T14, the fifteenth transistor T15, the first control circuit 110, the second control circuit 120 and the reset circuit 130 of the driving circuit 100 of the embodiment shown in FIG. 1, and thus the explanations are omitted.

In contrast with the driving circuit 100 of the embodiment shown in FIG. 1, the different in the driving circuit 200 of the embodiment shown in FIG. 7 is that the connection relationship of the first transistor T1 and the second transistor T2. Specifically, in the driving circuit 200, a first terminal of the thirteenth transistor T13 is electrically coupled to the first system high voltage terminal VDD_PAM. A second terminal of the thirteenth transistor T13 is electrically coupled to a first terminal of the second transistor T2. A second terminal of the second transistor T2 is electrically coupled to a first terminal of the first transistor T1. A second terminal of the first transistor T1 is electrically coupled to a first terminal of the fourteenth transistor T14. A second terminal of the fourteenth transistor T14 is electrically coupled to a first terminal of the light emitting element L1. A second terminal of the light emitting element L1 is electrically coupled to the system low voltage terminal VSS. In this case, when the driving circuit 200 cuts off the current path of the driving current according to the second transistor T2 during each of reset and emission periods EM, the voltage level at the second terminal of the first transistor T1 will not be suffer from the potential floating due to the change of current.

Figure 8:
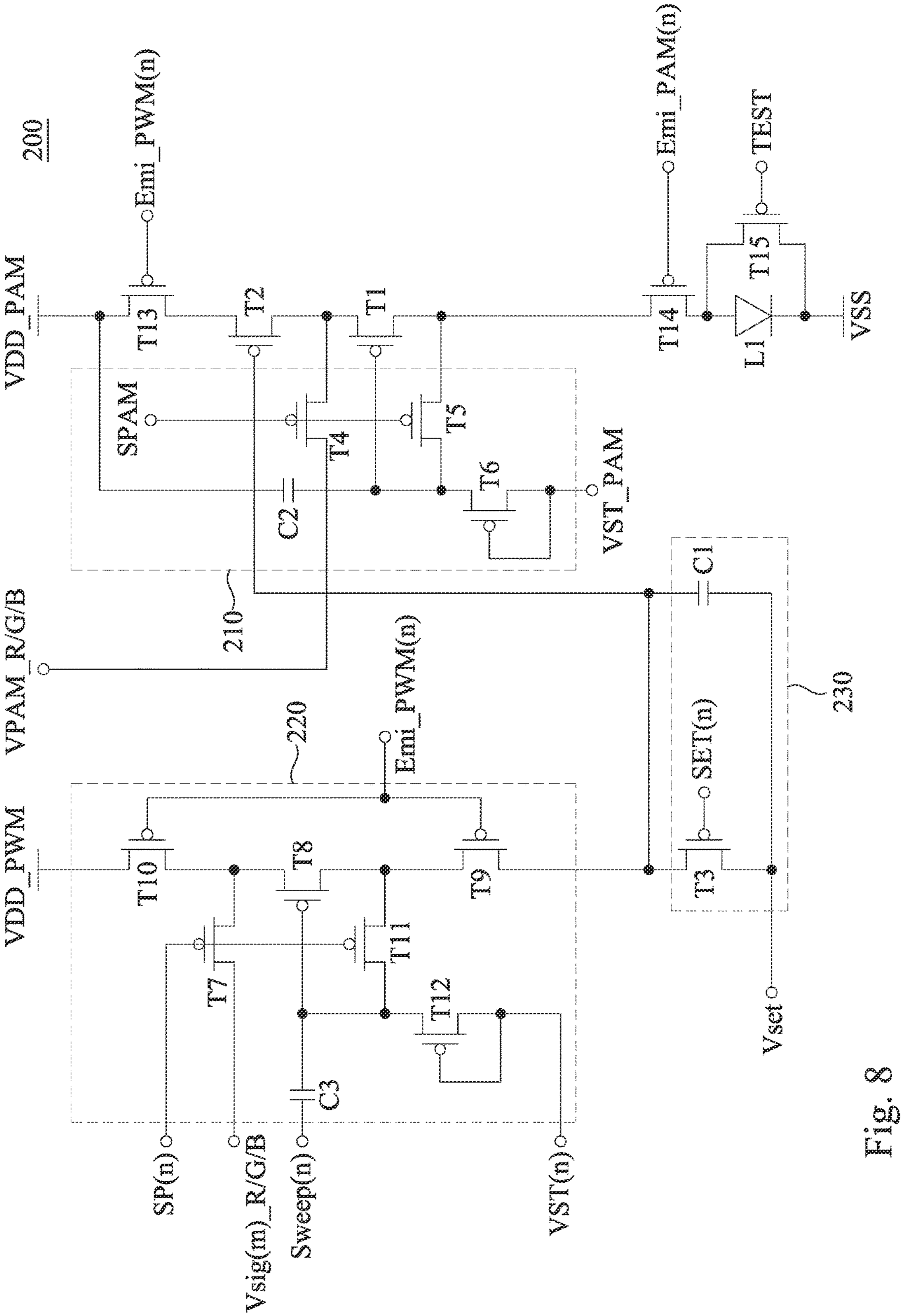
FIG. 8 is a circuit diagram of one of driving circuits and one of light emitting elements in accordance with some embodiments of the present disclosure.

Specifically, reference is made to FIG. 8. FIG. 8 is a circuit diagram of one of driving circuits 200 and one of light emitting elements L1 in accordance with some embodiments of the present disclosure. The first control circuit 210 includes a fourth transistor T4, a fifth transistor T5, a sixth transistor T6 and a second capacitor C2. The second control circuit 220 includes a seventh transistor T7, an eighth transistor T8, an ninth transistor T9, a tenth transistor T10, a eleventh transistor T11, a twelfth transistor T12 and a third capacitor C3. The reset circuit 230 includes a third transistor T3 and a first capacitor C1. The other detailed connection relationship and operation manner of the driving circuit 200 are substantially similar with the driving circuit 100 of the embodiment as shown in FIG. 2, and the driving circuits 100 of the display device 1000 as shown in FIG. 4 can be replaced/implemented by the driving circuit 200, and thus the explanations are omitted.

Figure 9:
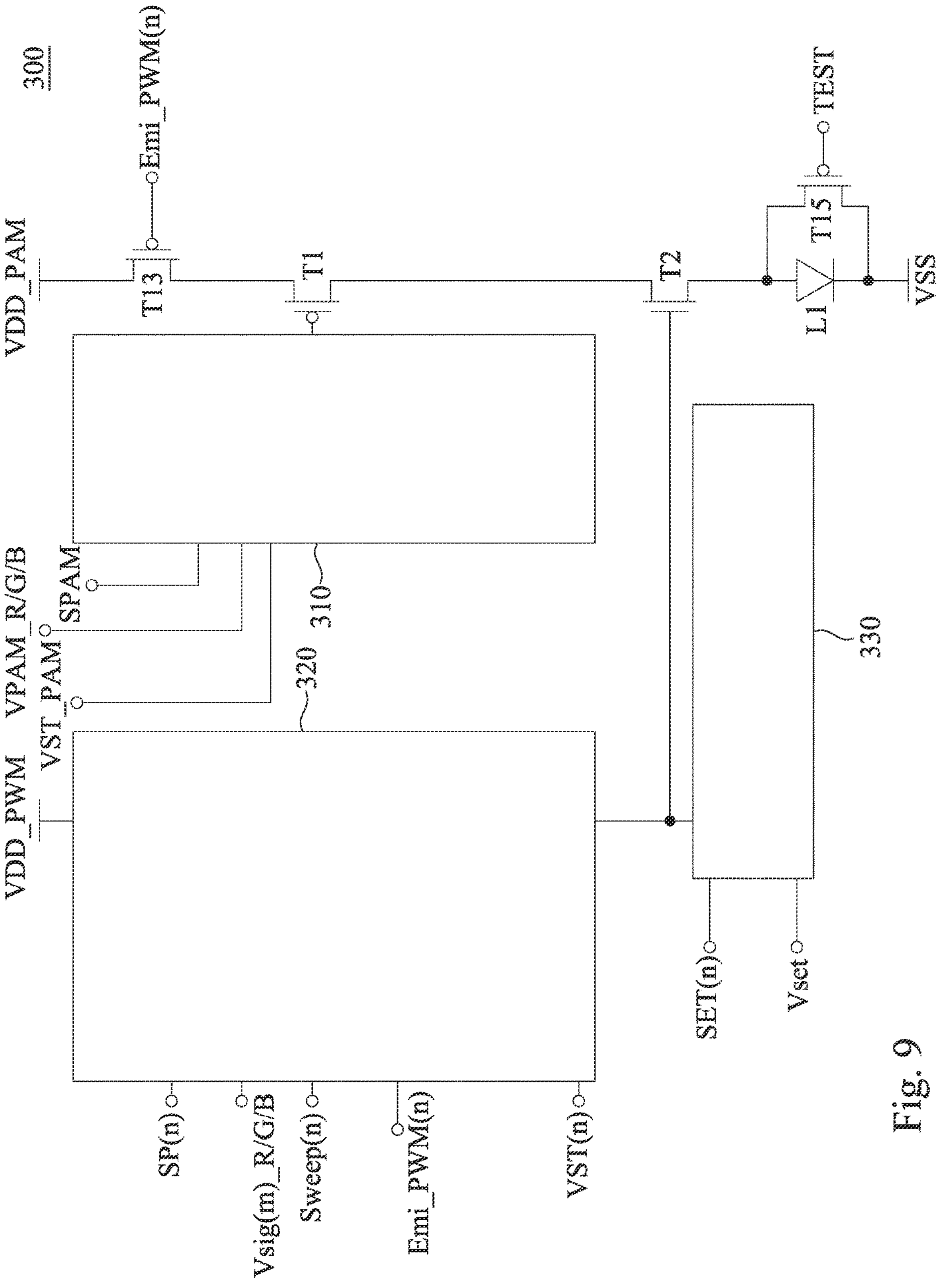
FIG. 9 is a functional block diagram of one of driving circuits and one of light emitting elements in accordance with some embodiments of the present disclosure.

Reference is made to FIG. 9. FIG. 9 is a functional block diagram of one of driving circuits 300 and one of light emitting elements L1 in accordance with some embodiments of the present disclosure. In the present disclosure, a display device can be constitute with multiple of sub-pixels, the display device may include multiple of driving circuits 300 and multiple of light emitting elements L1. For simplicity and clarity, FIG. 9 illustrates only one driving circuit 300 and one light emitting element L1. As shown in FIG. 9, the driving circuit 300 includes the first transistor T1, the second transistor T2, the first control circuit 310, the second control circuit 320 and the reset circuit 330. The driving circuit 300 further includes the thirteenth transistor T13 and the fifteenth transistor T15. The driving current generated by the driving circuit 300 flows from the first system high voltage terminal VDD_PAM through the thirteenth transistor T13, the second transistor T2, the first transistor T1 and the light emitting element L1 to the system low voltage terminal VSS.

The first control circuit 310 is electrically coupled to a gate terminal of the first transistor T1, and the first control circuit 310 is configured to adjust pulse amplitude of the driving current generated by the driving circuit 300. The second control circuit 320 is electrically coupled to a gate terminal of the second transistor T2, and the second control circuit 320 is configured to adjust pulse width of the driving current generated by the driving circuit 300. The reset circuit 330 is electrically coupled to the gate terminal of the second transistor T2, and the reset circuit 330 is configured to reset the voltage level at the gate terminal of the second transistor T2.

The first transistor T1, the second transistor T2, the thirteenth transistor T13, the fifteenth transistor T15, the first control circuit 310, the second control circuit 320 and the reset circuit 330 of the driving circuit 300 of the embodiment shown in FIG. 9 are respectively similar to the first transistor T1, the second transistor T2, the thirteenth transistor T13, the fifteenth transistor T15, the first control circuit 110, the second control circuit 120 and the reset circuit 130 of the driving circuit 100 of the embodiment shown in FIG. 1 and FIG. 2, and thus the explanations are omitted.

In contrast with the driving circuit 100 of the embodiment shown in FIG. 2, the difference in the driving circuit 300 of the embodiment shown in FIG. 9 is that the driving circuit 300 can operates without the fourteenth transistor T14, and the second transistor T2 can be implemented by N-type transistor. Specifically, in the driving circuit 300 of the embodiment shown in FIG. 9, a first terminal of the second transistor T2 is electrically coupled to a first terminal of the first transistor T1 which is a P-type transistor. A second terminal of the second transistor T2 is electrically coupled to a first terminal of the light emitting element L1. Since the second transistor T2 of the driving circuit 300 is implemented by N-type transistor, the second transistor T2 of the driving circuit 300 is to control the time point to start generating the driving current instead of controlling the time point to stop generating the driving current, and the time point to stop generating the driving current is according to the seventh control signal Emi_PAM(n). In other words, the second transistor T2 controls the time point of a rising edge of the driving current. For example, if the light emitting element L1 is to emit at a relatively high gray-level, the driving circuit 300 starts generating the driving current at the earlier time point during the sixth period P6. On the other hand, if the light emitting element L1 is to emit at a relatively low gray-level, the driving circuit 300 starts generating the driving current at the later time point during the sixth period P6. In this case, the transition time (rising time) of the driving current can be decreased to about 5.8 μs, so as to increase the image uniformity during low gray level by the circuit structure.

Figure 10:
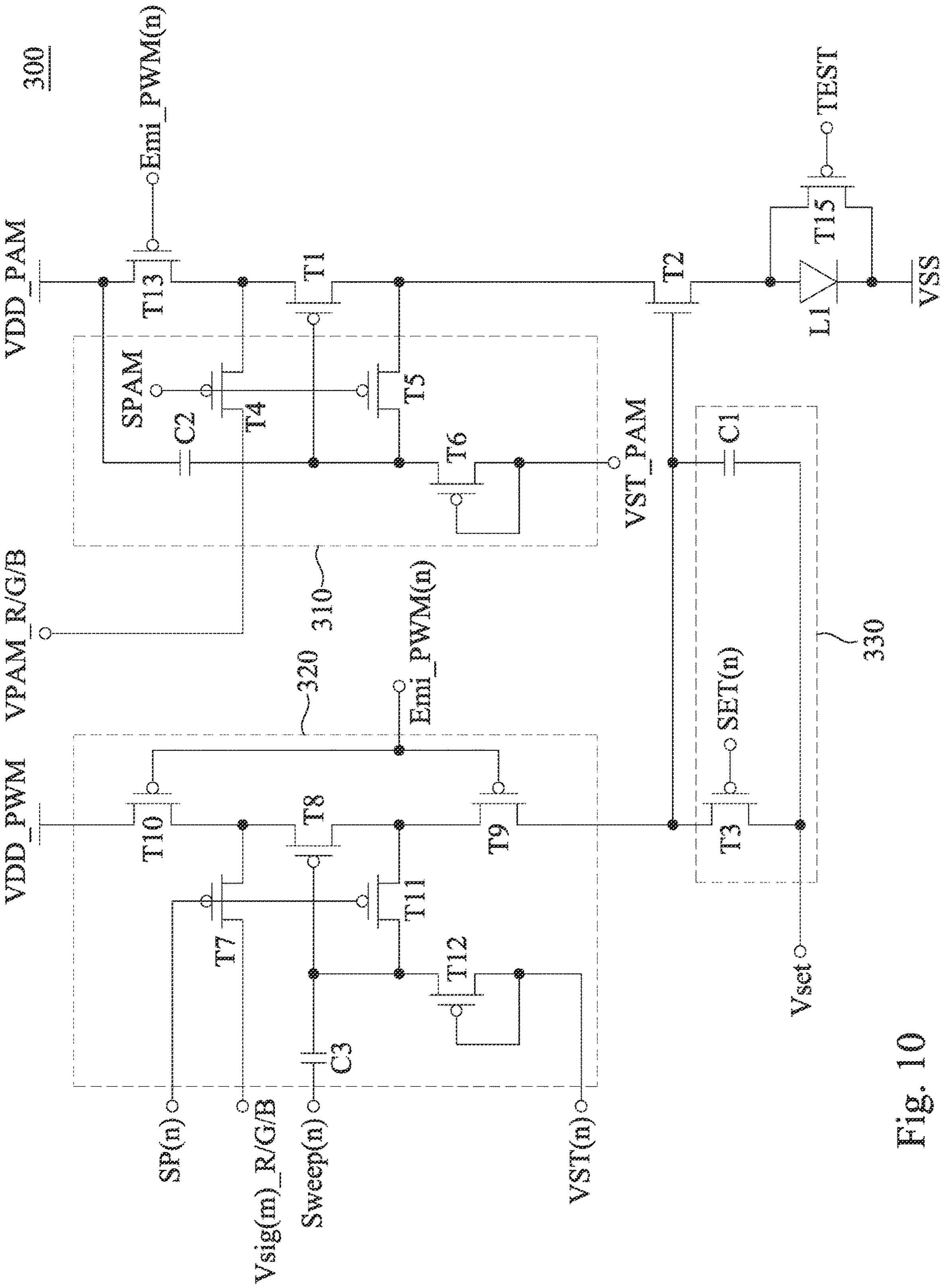
FIG. 10 is a circuit diagram of one of driving circuits and one of light emitting elements in accordance with some embodiments of the present disclosure.

Specifically, reference is made to FIG. 10. FIG. 10 is a circuit diagram of one of driving circuits 300 and one of light emitting elements L1 in accordance with some embodiments of the present disclosure. The first control circuit 310 includes a fourth transistor T4, a fifth transistor T5, a sixth transistor T6 and a second capacitor C2. The second control circuit 320 includes a seventh transistor T7, an eighth transistor T8, an ninth transistor T9, a tenth transistor T10 and a eleventh transistor T11, a twelfth transistor T12 and a third capacitor C3. The reset circuit 330 includes a third transistor T3 and a first capacitor C1. The other detailed connection relationship and operation manner of the driving circuit 300 are substantially similar with the driving circuit 100 of the embodiment as shown in FIG. 2, and the driving circuits 100 of the display device 1000 as shown in FIG. 4 can be replaced/implemented by the driving circuit 300, and thus the explanations are omitted.

Figure 11:
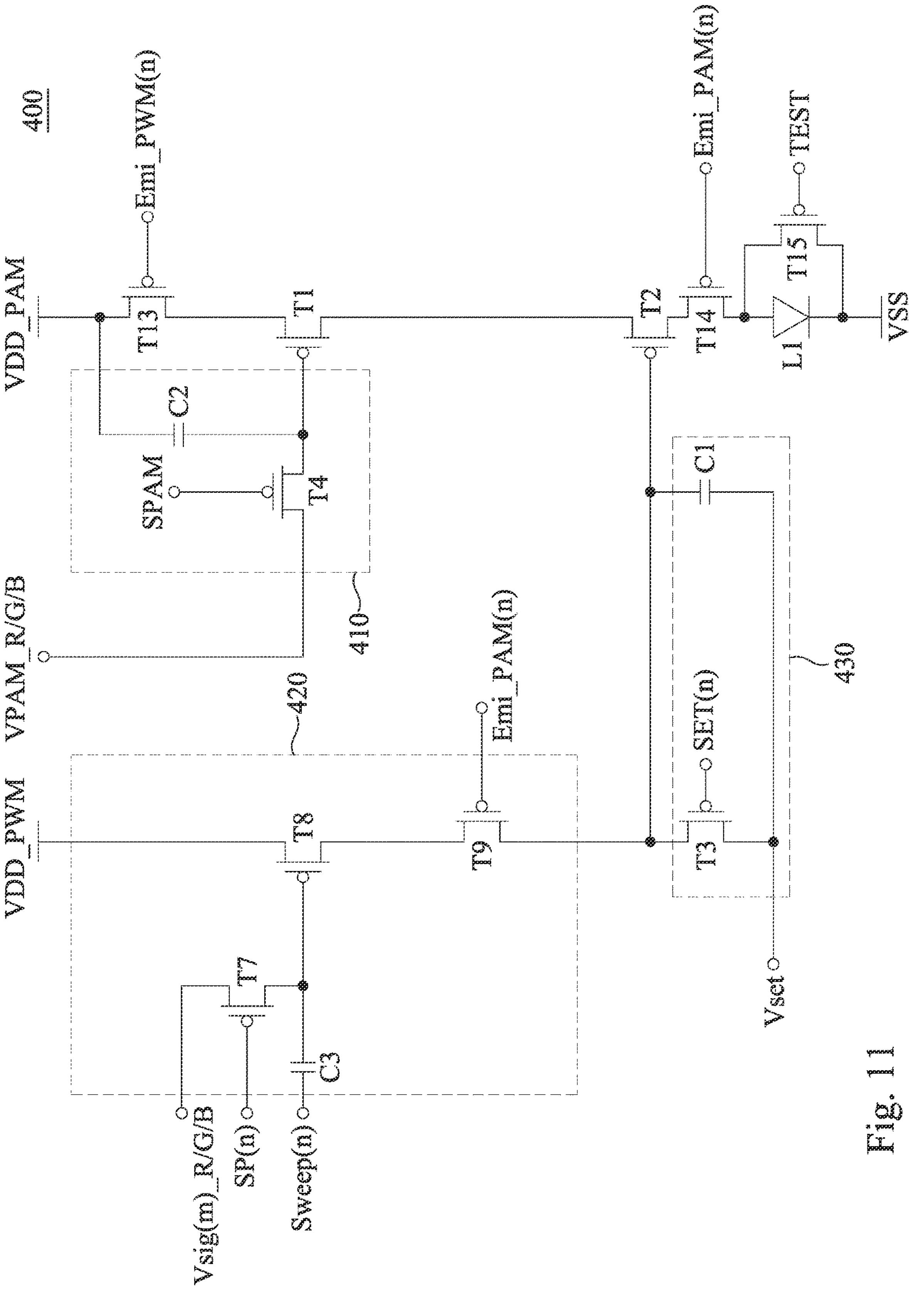
FIG. 11 is a circuit diagram of one of driving circuits and one of light emitting elements in accordance with some embodiments of the present disclosure.

Reference is made to FIG. 11. FIG. 11 is a circuit diagram of one of driving circuits 400 and one of light emitting elements L1 in accordance with some embodiments of the present disclosure. The driving circuit 400 includes a first transistor T1, a second transistor T2, a first control circuit 410, a second control circuit 420 and a reset circuit 430. The driving circuit 300 further includes a thirteenth transistor T13, a fourteenth transistor T14 and a fifteenth transistor T15. The driving current generated by the driving circuit 300 flows from the first system high voltage terminal VDD_PAM through the thirteenth transistor T13, the second transistor T2, the first transistor T1, the fourteenth transistor T14, and the light emitting element L1 to the system low voltage terminal VSS.

In contrast with the driving circuit 100 of the embodiment shown in FIG. 1, the difference in the driving circuit 400 of the embodiment shown in FIG. 11 is that the first control circuit 410 and the second control circuit 420 of the driving circuit 400 operate without the compensation circuit. Specifically, the driving circuit 400 of the embodiment shown in FIG. 11, the first control circuit 410 includes a fourth transistor T4 and a second capacitor C2. A first terminal of the fourth transistor T4 is configured to receive a corresponding one of the first data signals VPAM_R/G/B. A second terminal of the fourth transistor T4 is electrically coupled to a second terminal of the second capacitor C2 and a gate terminal of the first transistor T1. A gate terminal of the fourth transistor T4 is configured to receive the second control signal SPAM. A first terminal of the second capacitor C2 is electrically coupled to the first system high voltage terminal VDD_PAM. And, the second control circuit 420 includes a seventh transistor T7 and a third capacitor C3. A first terminal of the seventh transistor T7 is configured to receive a corresponding one of the second data signals Vsig(m)_R/G/B. A second terminal of the seventh transistor T7 is electrically coupled to a second terminal of the third capacitor C3 and a gate terminal of the eighth transistor T8. A gate terminal of the seventh transistor T7 is configured to receive the fourth control signal SP(n). A first terminal of the third capacitor C3 is configured to receive the sweep signal Sweep(n). In contrast with the driving circuit 400 of the embodiment shown in FIG. 1, since the first control circuit 410 and the second control circuit 420 of the driving circuit 400 operate without the compensation circuit, the first control circuit 410 and the second control circuit 420 does not receive the third control signal VST_PAM and the sixth control signal VST(n). In other words, in contrast with the driving circuit 100, the driving circuit 400 operates during the operation timing without the first period P1 and the third period P3. Therefore, the circuit architecture area and the operation timing can be greatly decreased. The other detailed connection relationship and operation manner of the driving circuit 400 are substantially similar with the driving circuit 100 of the embodiment as shown in FIG. 1, and the driving circuits 100 of the display device 1000 as shown in FIG. 4 can be replaced/implemented by the driving circuit 400, and thus the explanations are omitted.

Figure 12:
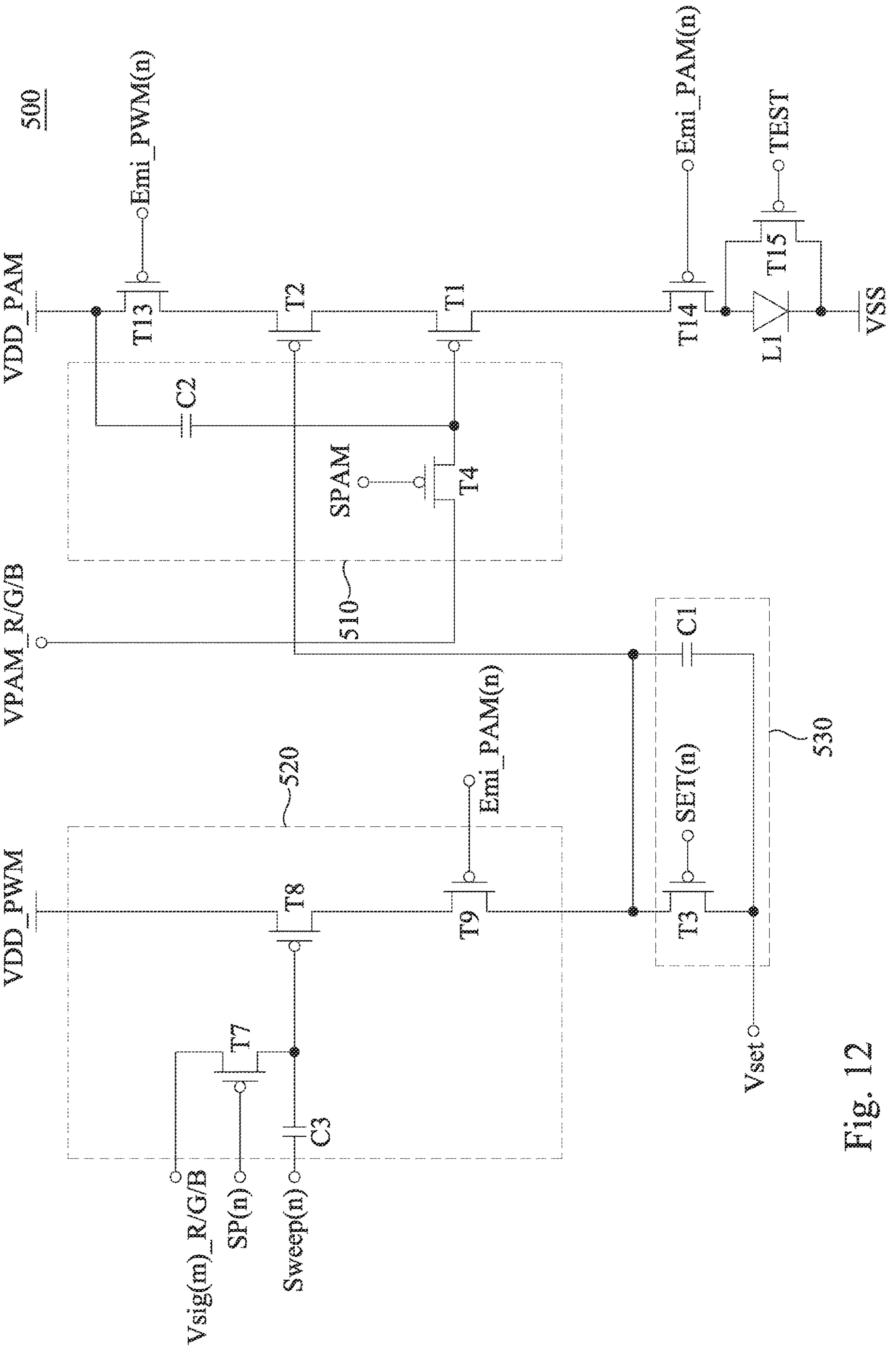
FIG. 12 is a circuit diagram of one of driving circuits and one of light emitting elements in accordance with some embodiments of the present disclosure.

Reference is made to FIG. 12. FIG. 12 is a circuit diagram of one of driving circuits 500 and one of light emitting elements L1 in accordance with some embodiments of the present disclosure. In the present disclosure, a display device can be constitute with multiple of sub-pixels, the display device may include multiple of driving circuits 500 and multiple of light emitting elements L1. For simplicity and clarity, FIG. 12 illustrates only one driving circuit 500 and one light emitting element L1. As shown in FIG. 12, the driving circuit 500 includes a first transistor T1, a second transistor T2, a first control circuit 510, a second control circuit 520 and a reset circuit 530. The driving circuit 500 further includes a thirteenth transistor T13, a fourteenth transistor T14 and a fifteenth transistor T15. The driving current generated by the driving circuit 500 flows from the first system high voltage terminal VDD_PAM through the thirteenth transistor T13, the second transistor T2, the first transistor T1, the fourteenth transistor T14 and the light emitting element L1 to the system low voltage terminal VSS.

In contrast with the driving circuit 200 of the embodiment shown in FIG. 8, the difference in the driving circuit 500 of the embodiment shown in FIG. 12 is that the first control circuit 510 and the second control circuit 520 of the driving circuit 500 operate without the compensation circuit. Specifically, in the driving circuit 500 of the embodiment shown in FIG. 12, the first control circuit 510 includes a fourth transistor T4 and a second capacitor C2. A first terminal of the fourth transistor T4 is configured to receive a corresponding one of the first data signals VPAM_R/G/B. A second terminal of the fourth transistor T4 is electrically coupled to a second terminal of the second capacitor C2 and a gate terminal of the first transistor T1. A gate terminal of the fourth transistor T4 is configured to receive the second control signal SPAM. A first terminal of the second capacitor C2 is electrically coupled to the first system high voltage terminal VDD_PAM. And, the second control circuit 520 includes a seventh transistor T7 and a third capacitor C3. A first terminal of the seventh transistor T7 is configured to receive a corresponding one of the second data signals Vsig(m)_R/G/B. A second terminal of the seventh transistor T7 is electrically coupled to a second terminal of the third capacitor C3 and a gate terminal of the eighth transistor T8. A gate terminal of the seventh transistor T7 is configured to receive the fourth control signal SP(n). A first terminal of the third capacitor C3 is configured to receive the sweep signal Sweep(n). In contrast with the driving circuit 200 of the embodiment as shown in FIG. 8, since the first control circuit 510 and the second control circuit 520 of the first control circuit 510 operate without the compensation circuit, the first control circuit 510 and the second control circuit 520 does not receive the third control signal VST_PAM and the sixth control signal VST(n). In other words, in contrast with the driving circuit 200, the driving circuit 500 operates during the operation timing without the first period P1 and the third period P3, and therefore the circuit architecture area of the driving circuit 500 can be greatly decreased. The other detailed connection relationship and operation manner of the driving circuit 500 are substantially similar with the driving circuit 200 of the embodiment as shown in FIG. 8, and the driving circuits 100 of the display device 1000 as shown in FIG. 4 can be replaced/implemented by the driving circuit 500, and thus the explanations are omitted.

Figure 13:
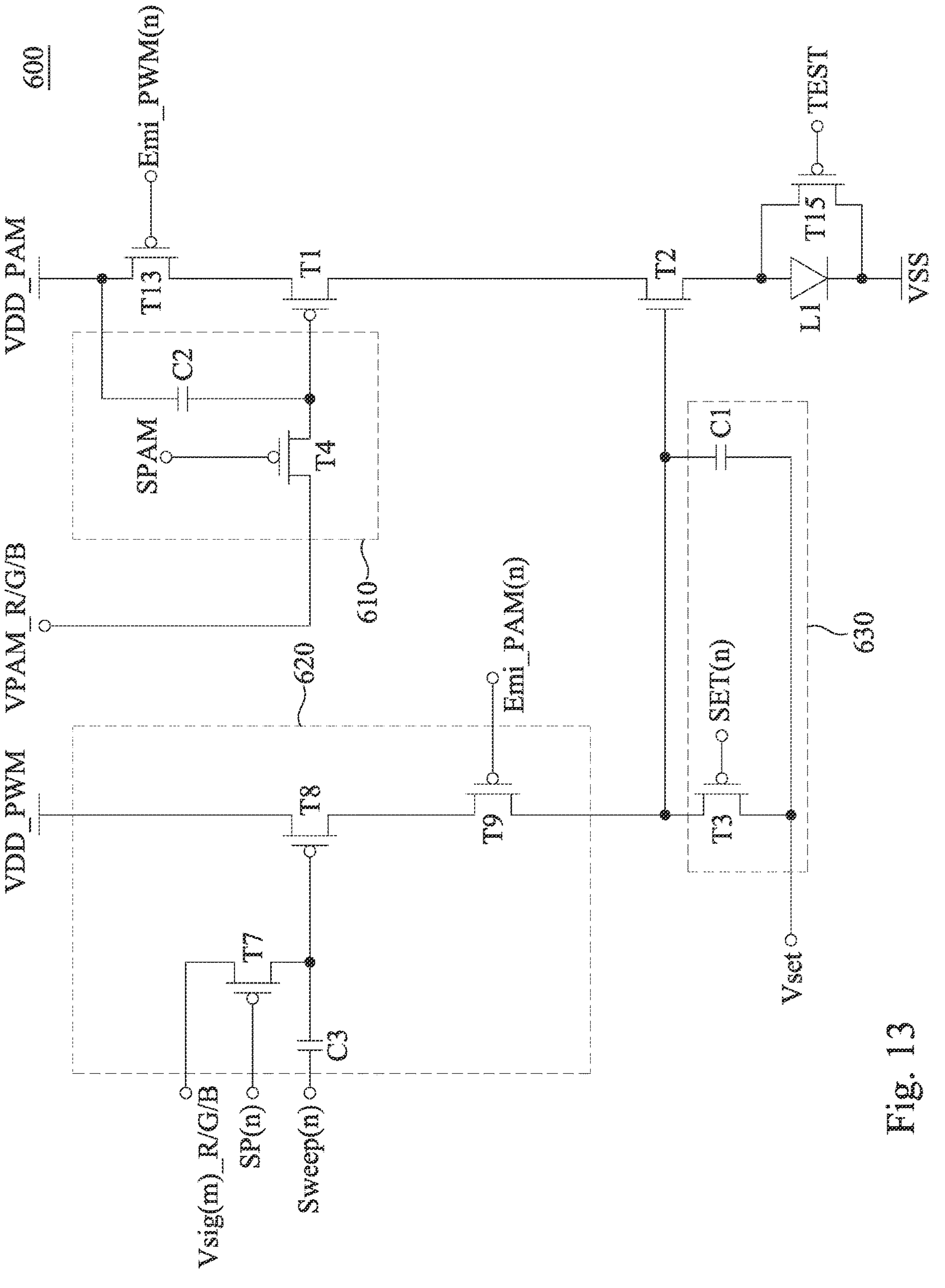
FIG. 13 is a circuit diagram of one of driving circuits and one of light emitting elements in accordance with some embodiments of the present disclosure.

Reference is made to FIG. 13. FIG. 13 is a circuit diagram of one of driving circuits 600 and one of light emitting elements L1 in accordance with some embodiments of the present disclosure. In the present disclosure, a display device can be constitute with multiple of sub-pixels, the display device may include multiple of driving circuits 600 and multiple of light emitting elements L1. For simplicity and clarity, FIG. 13 illustrates only one driving circuit 600 and one light emitting element L1. As shown in FIG. 13, the driving circuit 600 includes a first transistor T1, a second transistor T2, a first control circuit 610, a second control circuit 620 and a reset circuit 630. The driving circuit 600 further includes a thirteenth transistor T13, a fourteenth transistor T14 and a fifteenth transistor T15. The driving current generated by the driving circuit 600 flows from the first system high voltage terminal VDD_PAM through the thirteenth transistor T13, the second transistor T2, the first transistor T1, the fourteenth transistor T14 and the light emitting element L1 to the system low voltage terminal VSS.

In contrast with the driving circuit 300 of the embodiment shown in FIG. 10, the difference in the driving circuit 600 of the embodiment shown in FIG. 13 is that the first control circuit 610 and the second control circuit 620 of the driving circuit 600 operate without the compensation circuit. Specifically, in the driving circuit 600 of the embodiment as shown in FIG. 12, the first control circuit 610 includes a fourth transistor T4 and a second capacitor C2. A first terminal of the fourth transistor T4 is configured to receive a corresponding one of the first data signals VPAM_R/G/B. A second terminal of the fourth transistor T4 is electrically coupled to a second terminal of the second capacitor C2 and a gate terminal of the first transistor T1. A gate terminal of the fourth transistor T4 is configured to receive the second control signal SPAM. A first terminal of the second capacitor C2 is electrically coupled to the first system high voltage terminal VDD_PAM.

And, the second control circuit 620 includes a seventh transistor T7 and a third capacitor C3. A first terminal of the seventh transistor T7 is configured to receive a corresponding one of the second data signals Vsig(m)_R/G/B. A second terminal of the seventh transistor T7 is electrically coupled to a second terminal of the third capacitor C3 and a gate terminal of the eighth transistor T8. A gate terminal of the seventh transistor T7 is configured to receive the fourth control signal SP(n). A first terminal of the third capacitor C3 is configured to receive the sweep signal Sweep(n). In contrast with the driving circuit 300 of the embodiment as shown in FIG. 10, since the first control circuit 610 and the second control circuit 620 of the driving circuit 600 operate without the compensation circuit, the first control circuit 610 and the second control circuit 620 does not receive the third control signal VST_PAM and the sixth control signal VST (n). In other words, in contrast with the driving circuit 300, the operation timing for the driving circuit 600 operates without the first period P1 and the third period P3, and therefore the circuit architecture area of the driving circuit 600 can be greatly decreased. The other detailed connection relationship and operation manner of the driving circuit 600 are substantially similar with the driving circuit 300 of the embodiment as shown in FIG. 10, and the driving circuits 100 of the display device 1000 as shown in FIG. 4 can be replaced/implemented by the driving circuit 600, and thus the explanations are omitted.

Summary, the display device 1000 simultaneously provides the first data signals VPAM_R/G/B to the driving circuits 100 in different lines. In additional, the display device 1000 progressively provides the sweep signals Sweep (n) to the driving circuits 100 in different lines such that the emission periods of the driving circuit 100 in different lines has different time phase, in order to increase the ratio occupied by the emission period in one frame. And, the pulse width of the driving current flowing through the light emitting element L1 is adjusted to control the gray level, in order to increase the image uniformity of the display device.

Although specific embodiments of the disclosure have been disclosed with reference to the above embodiments, these embodiments are not intended to limit the disclosure. Various alterations and modifications may be performed on the disclosure by those of ordinary skills in the art without departing from the principle and spirit of the disclosure. Thus, the protective scope of the disclosure shall be defined by the appended claims.

What is claimed is:

1. A display device, comprising:
- a plurality of light emitting elements; and
- a plurality of driving circuits, each of the driving circuits is configured to generate a driving current to drive one of the light emitting elements to emit light, wherein each of the driving circuits comprises:
- a first transistor, wherein the first transistor is a P type-transistor;
- a second transistor, wherein the second transistor is an N-type transistor, wherein the second transistor is configured to control timing of a rising edge of the driving current in an emission period, wherein the second transistor is directly connected to the one of the light emitting elements, and wherein the driving current flows from a first system high voltage terminal sequentially through the first transistor, the second transistor and the one of the light emitting elements to a system low voltage terminal;
- a reset circuit, configured to reset a voltage level of a gate terminal of the second transistor;
- a first control circuit, configured to control the first transistor to adjust pulse amplitude of the driving current; and
- a second control circuit, configured to control the second transistor to adjust a pulse width of the driving current, and configured to control the second transistor, according to a corresponding one of a plurality of sweep signals, to adjust a phase of the driving current,
- wherein each of the driving circuits provides the driving current at different time points according to the sweep signals.

2. The display device of claim 1, wherein the display device simultaneously provides a plurality of first data signals to the driving circuits during a global scanning period, and wherein the display device sequentially provides the sweep signals to the driving circuits during a progressive scanning period.

3. The display device of claim 1, wherein the reset circuit comprising:
- a third transistor, with a first terminal electrically coupled to the gate terminal of the second transistor, with a gate configured to receive a first control signal; and
- a first capacitor, with a first terminal electrically coupled to the gate terminal of the second transistor and the first terminal of the third transistor, with a second terminal electrically coupled to a second terminal of the third transistor.

4. The display device of claim 1, wherein the first control circuit comprising:
- a second capacitor, with a first terminal electrically coupled to the first system high voltage terminal, with a second terminal electrically coupled to a gate terminal of the first transistor; and
- a fourth transistor, with a first terminal configured to receive one of a plurality of first data signals, with a second terminal electrically coupled to a gate terminal of the first terminal and the second terminal of the second capacitor, with a gate terminal configured to receive a second control signal.

5. The display device of claim 1, wherein the first control circuit comprising:
- a second capacitor, with a first terminal electrically coupled to the first system high voltage terminal, with a second terminal electrically coupled to a gate terminal of the first transistor;
- a fourth transistor, with a first terminal configured to receive one of a plurality of first data signals, with a second terminal electrically coupled to a first terminal of the first transistor, with a gate terminal configured to receive a second control signal;
- a fifth transistor, with a first terminal electrically coupled to a gate terminal of the first transistor, with a second terminal electrically coupled to a second terminal of the first transistor, with a gate terminal configured to receive the second control signal; and
- a sixth transistor, with a first terminal electrically coupled to the first terminal of the fifth transistor, with a second terminal configured to receive a third control signal, with a gate terminal configured to receive the third control signal.

6. The display device of claim 1, wherein the second control circuit comprising:
- a seventh transistor, with a first terminal configured to receive one of a plurality of second data signals, with a gate terminal configured to receive a fourth control signal;
- an eighth transistor, with a first terminal electrically coupled to a second system high voltage terminal, with a gate terminal electrically coupled to a second terminal of the seventh transistor;
- a ninth transistor, with a first terminal electrically coupled to a second terminal of the eighth transistor, with a second terminal electrically coupled to the gate terminal of the second transistor, with a gate terminal configured to receive a fifth control signal; and
- a third capacitor, with a first terminal configured to receive the corresponding one of the sweep signals, with a second terminal electrically coupled to the gate terminal of the eighth transistor.

7. The display device of claim 1, wherein the second control circuit comprising:

a seventh transistor, with a first terminal configured to receive one of a plurality of second data signals, with a gate terminal configured to receive a fourth control signal;

an eighth transistor, with a first terminal electrically coupled to a second terminal of the seventh transistor;

a ninth transistor, with a first terminal electrically coupled to a second terminal of the eighth transistor, with a second terminal electrically coupled to the gate terminal of the second transistor, with a gate terminal configured to receive a fifth control signal;

a tenth transistor, with a first terminal electrically coupled to a second system high voltage terminal, with a second terminal electrically coupled to the second terminal of the seventh transistor and the first terminal of the eighth transistor, with a gate terminal configured to receive the fifth control signal;

a third capacitor, with a first terminal configured to receive the corresponding one of the sweep signals, with a second terminal electrically coupled to a gate terminal of the eighth transistor;

an eleventh transistor, with a first terminal electrically coupled to the second terminal of the third capacitor and the gate terminal of the eighth transistor, with a second terminal electrically coupled to the second terminal of the eighth transistor and the first terminal of the ninth transistor, with a gate terminal configured to receive the fourth control signal; and a twelfth transistor, with a first terminal electrically coupled to the second terminal of the third capacitor, the gate terminal of the eighth transistor and the first terminal of the eleventh transistor, with a second terminal configured to receive a sixth control signal, with a gate terminal configured to receive the sixth control signal.

8. The display device of claim 1, further comprising:

a thirteenth transistor, with a first terminal electrically coupled to the first system high voltage terminal, with a second terminal electrically coupled to a first terminal of the first transistor, with a gate terminal configured to receive a fifth control signal, wherein a second terminal of the first transistor is electrically coupled to a first terminal of the second transistor, wherein a first terminal of the one of the light emitting elements is electrically coupled to a second terminal of the second transistor, and wherein a second terminal of the one of the light emitting elements is electrically coupled to the system low voltage terminal.

9. A display device, comprising:

a plurality of light emitting element; and a plurality of driving circuit, each of the driving circuits is configured to generate a driving current to drive one of the light emitting elements to emit light, wherein each of the driving circuits comprises:

a first transistor, wherein the first transistor is a P type transistor;

a second transistor, wherein the first transistor is an N type transistor, wherein the second transistor is configured to control timing of a rising edge of the driving current in an emission period, wherein the second transistor is directly connected to the one of the light emitting elements, and wherein the first transistor, the second transistor and the one of the light emitting elements are sequentially connected in series between a first system high voltage terminal to a system low voltage terminal;

a reset circuit, electrically coupled to a gate terminal of the second transistor;

a first control circuit, electrically coupled to a gate terminal of the first transistor, and configured to control the first transistor to adjust pulse amplitude of the driving current; and a second control circuit, electrically coupled to the gate terminal of the second transistor, and configured to control the second transistor to adjust a pulse width of the driving current, and configured to control the second transistor, according to a corresponding one of a plurality of sweep signals, to adjust a phase of the driving current, wherein each of the driving circuits provides the driving current at different time points according to the sweep signals.

10. A driving method, for driving a display device with a plurality of driving circuits and a plurality of light emitting elements, wherein each of the driving circuits is configured to generate a driving current to drive the one of the light emitting elements to emit light, wherein each of the driving circuits comprises a first transistor configured to control pulse amplitude of the driving current and a second transistor configured to control pulse width of the driving current, wherein the first transistor, the second transistor and the one of the light emitting elements are sequentially connected in series between a first system high voltage terminal to a system low voltage terminal, wherein the first transistor is a P-type transistor, wherein the second transistor is an N-type transistor, wherein the second transistor is configured to control timing of a rising edge of the driving current in an emission period, wherein the second transistor is directly connected to the one of the light emitting elements, and wherein the driving method comprising:

during a global scanning period, simultaneously providing a plurality of first data signals to the driving circuits according to color of each of the light emitting elements to be display; and during a progressive scanning period, sequentially providing a plurality of second data signals to the driving circuits according to gray level of each of the light emitting elements to be display, and sequentially providing a plurality of sweep signals to the driving circuits, wherein each of the driving circuits generates the driving current, according to the one of the first data signals, to drive the one of the light emitting elements to emit light, and wherein each of the driving circuits starts generating the driving current according to one of the second data signals.

* * * * *